(12) United States Patent
Grossman et al.

(10) Patent No.: US 12,073,494 B2
(45) Date of Patent: Aug. 27, 2024

(54) TECHNIQUES FOR ANALYZING THE PROFICIENCY OF USERS OF SOFTWARE APPLICATIONS

(71) Applicant: AUTODESK, INC., San Francisco, CA (US)

(72) Inventors: Tovi Grossman, Toronto (CA); Alexandra R. Bergin, Danville, CA (US); Benjamin Lafreniere, Toronto (CA); Jaime A. Perkins, San Francisco, CA (US); Adam L. Menter, Oakland, CA (US); Howard R. Swearer, San Francisco, CA (US); George Fitzmaurice, Toronto (CA); Justin Frank Matejka, Newmarket (CA); Jiin Shin, Old Tappan, NJ (US); William C. Sabram, Lynn, MA (US); Michael L. McManus, Oakdale, CA (US)

(73) Assignee: AUTODESK, INC., San Francisco, CA (US)

( * ) Notice: Subject to any disclaimer, the term of this patent is extended or adjusted under 35 U.S.C. 154(b) by 279 days.

(21) Appl. No.: 16/364,010

(22) Filed: Mar. 25, 2019

(65) Prior Publication Data

US 2020/0133819 A1    Apr. 30, 2020

Related U.S. Application Data

(60) Provisional application No. 62/750,720, filed on Oct. 25, 2018.

(51) Int. Cl.
*G06T 11/20*    (2006.01)
*G06F 3/0481*   (2022.01)
(Continued)

(52) U.S. Cl.
CPC .......... *G06T 11/206* (2013.01); *G06F 3/0481* (2013.01); *G06F 3/0484* (2013.01);
(Continued)

(58) Field of Classification Search
CPC .............. G06T 11/206; G09B 19/0053; G06Q 10/06398; G06F 11/3438
See application file for complete search history.

(56) References Cited

U.S. PATENT DOCUMENTS 6,343,508 B1   2/2002   Feller
7,519,539 B1   4/2009   Fliess et al.
(Continued)

FOREIGN PATENT DOCUMENTS

WO           98/05018 A1    2/1998

OTHER PUBLICATIONS

Final Office Action received for U.S. Appl. No. 16/363,997, dated Jul. 28, 2020, 47 pages.
(Continued)

*Primary Examiner* — Justin R. Blaufeld
(74) *Attorney, Agent, or Firm* — Artegis Law Group, LLP

(57) ABSTRACT

A command map GUI that illustrates command usage patterns of a first entity and/or a comparison between the first entity and a second entity. A server receives and stores command usage data from a plurality of clients, each client executing a software application that enables a set of commands. A client displays the GUI based on command usage data received from the server. The GUI displays a circle chart comprising a plurality of segments representing various command categories, each segment including a wedge that represents the amount of usage of the corresponding command category. The GUI also displays a plurality of data points, each data point representing a command, wherein the distance from the center of the circle chart represents the
(Continued)

amount of usage of the corresponding command. The GUI may display a certification and/or an unused command recommended for a user based on command usage patterns of the user.

13 Claims, 22 Drawing Sheets

(51) Int. Cl.
*G06F 3/0484* (2022.01)
*G06F 11/34* (2006.01)
*G06Q 10/0639* (2023.01)
*G06Q 30/018* (2023.01)
*G09B 19/00* (2006.01)

(52) U.S. Cl.
CPC ... *G06F 11/3438* (2013.01); *G06Q 10/06398* (2013.01); *G06Q 30/018* (2013.01); *G09B 19/0053* (2013.01)

(56) References Cited

U.S. PATENT DOCUMENTS

| | | |
|---|---|---|
| 7,692,653 B1 | 4/2010 | Petro et al. |
| 8,350,856 B1 | 1/2013 | Nazir et al. |
| 8,610,718 B2 | 12/2013 | Suntinger et al. |
| 8,965,874 B1 | 2/2015 | Vassilakis |
| 9,424,670 B1 | 8/2016 | Jin et al. |
| 10,475,219 B1 | 11/2019 | Antihi et al. |
| 2005/0093866 A1 | 5/2005 | Ebert |
| 2005/0246184 A1 | 11/2005 | Abbadessa et al. |
| 2008/0208027 A1 | 8/2008 | Heaton |
| 2008/0262887 A1 | 10/2008 | Guthrie |
| 2008/0270203 A1 | 10/2008 | Holmes et al. |
| 2009/0049389 A1 | 2/2009 | Kuzmanovic |
| 2010/0131896 A1 | 5/2010 | Fitzmaurice et al. |
| 2011/0115814 A1 | 5/2011 | Heimendinger et al. |
| 2011/0154216 A1 | 6/2011 | Aritsuka et al. |
| 2012/0117476 A1 | 5/2012 | Siegrist et al. |
| 2012/0253891 A1 | 10/2012 | Hayes et al. |
| 2013/0076756 A1 | 3/2013 | Pritting |
| 2013/0328745 A1 | 12/2013 | Koltuk et al. |
| 2014/0025441 A1 | 1/2014 | Eberlein et al. |
| 2014/0379694 A1 | 12/2014 | Denise |
| 2015/0032873 A1 | 1/2015 | Chen et al. |
| 2015/0040052 A1 | 2/2015 | Noel et al. |
| 2015/0089424 A1 | 3/2015 | Duffield et al. |
| 2015/0100897 A1 | 4/2015 | Sun et al. |
| 2015/0229532 A1 | 8/2015 | Somaiya et al. |
| 2015/0235155 A1 | 8/2015 | McGuffin |
| 2015/0301997 A1 | 10/2015 | Otaki |
| 2015/0302535 A1 | 10/2015 | Dodd |
| 2015/0324106 A1 | 11/2015 | Lewis et al. |
| 2015/0331921 A1 | 11/2015 | Kudo et al. |
| 2016/0019400 A1 | 1/2016 | Li et al. |
| 2016/0098177 A1 | 4/2016 | Kraut |
| 2016/0132203 A1 | 5/2016 | Seto et al. |
| 2016/0260346 A1 | 9/2016 | Lafrinere et al. |
| 2016/0275436 A1 | 9/2016 | Kurjanowicz et al. |
| 2016/0343100 A1 | 11/2016 | Davenport et al. |
| 2017/0154307 A1* | 6/2017 | Maurya ............. H04L 67/306 |
| 2017/0185253 A1 | 6/2017 | Vaglio |
| 2017/0351686 A1 | 12/2017 | Fackler et al. |
| 2018/0004851 A1 | 1/2018 | Zarins et al. |
| 2018/0011876 A1 | 1/2018 | Li et al. |
| 2018/0012391 A1 | 1/2018 | Han et al. |
| 2018/0239496 A1 | 8/2018 | Zhang et al. |
| 2018/0301047 A1 | 10/2018 | Mayoraz |
| 2018/0341394 A1 | 11/2018 | Sangli et al. |
| 2018/0357922 A1 | 12/2018 | Dutta et al. |
| 2019/0122161 A1 | 4/2019 | Cicio, Jr. |
| 2019/0244113 A1 | 8/2019 | Ramos et al. |
| 2020/0050431 A1 | 2/2020 | Zilouchian Moghaddam et al. |
| 2020/0133819 A1 | 4/2020 | Grossman et al. |
| 2020/0159862 A1 | 5/2020 | Kleiner et al. |
| 2020/0177593 A1 | 6/2020 | Bender et al. |
| 2021/0294519 A1 | 9/2021 | Radhapuram et al. |

OTHER PUBLICATIONS

International Search Report for application No. PCT/US2019/057457 dated May 4, 2020.
Non-Final Office Action for U.S. Appl. No. 16/363,997; dated Jan. 6, 2021; 36 pages.
Partial Search Report for application No. PCT/US2019/057457 dated Feb. 5, 2020.
Non-Final Office Action received for U.S. Appl. No. 16/363,997, dated Mar. 26, 2020, 39 pages.
Final Office Action for U.S. Appl. No. 16/363,997, dated Jul. 28, 2021, 32 pages.
Non-Final Office Action received for U.S. Appl. No. 17/069,334, dated Oct. 28, 2021, 16 pages.
Non Final Office Action received for U.S. Appl. No. 16/363,997, dated Apr. 28, 2022, 53 pages.
Final Office Action received for U.S. Appl. No. 17/069,334 dated Feb. 11, 2022, 23 pages.
Final Office Action received for U.S. Appl. No. 17/069,334 dated Mar. 6, 2023, 21 pages.
Advisory Action received for U.S. Appl. No. 16/363,997, dated Feb. 8, 2023, 8 pages.
Non Final Office Action received for U.S. Appl. No. 17/069,334, dated Aug. 18, 2023, 14 pages.
Non Final Office Action received for U.S. Appl. No. 16/363,997, dated Apr. 27, 2023, 46 pages.
Non Final Office Action received for U.S. Appl. No. 17/069,334 dated Nov. 10, 2022, 26 pages.
Final Office Action received for U.S. Appl. No. 16/363,997, dated Nov. 17, 2022, 47 pages.
Final Office Action received for U.S. Appl. No. 16/363,997, dated Nov. 7, 2023, 62 pages.
Final Office Action received for U.S. Appl. No. 17/069,334, dated Nov. 30, 2023, 14 pages.
Notice of Allowance received for U.S. Appl. No. 16/363,997, dated Feb. 5, 2024, 20 pages.
Notice of Allowance received for U.S. Appl. No. 17/069,334, dated Jun. 7, 2024, 15 pages.

* cited by examiner

114

| | 205 | 210 | 215 | 220 | |
|---|---|---|---|---|---|
| 201a | Category1 | 0-45 | Command1a<br>Command1b<br>Command1c<br>⋮ | 1<br>2<br>3<br>⋮ | |
| 201b | Category2 | 45-90 | Command2a<br>Command2b<br>Command2c<br>⋮ | 45<br>46<br>47<br>⋮ | } 200 |
| 201c | Category3 | 90-135 | Command3a<br>Command3b<br>Command3c<br>⋮ | 91<br>92<br>93<br>⋮ | |

⋮

| | | | | | |
|---|---|---|---|---|---|
| 251a | Level1 | 0-w1 | 0-9 | r1 | |
| 251b | Level2 | w2-w3 | 10-149 | r2 | } 250 |
| 251c | Level3 | w4-w5 | 150-299 | r3 | |
| | 255 | 260 | 265 | 270 | |

Figure 2

TECHNIQUES FOR ANALYZING THE PROFICIENCY OF USERS OF SOFTWARE APPLICATIONS

CROSS-REFERENCE TO RELATED APPLICATIONS

This application claims the benefit of United States provisional patent application titled "TECHNIQUES FOR GENERATIVE LEARNING APPLICATIONS," filed on Oct. 25, 2018 and having Ser. No. 62/750,720. The subject matter of this related application is hereby incorporated herein by reference.

BACKGROUND OF THE INVENTION

Field of the Various Embodiments

The present invention relates generally to computer science and, more specifically, to techniques for analyzing the proficiency of users of software applications.

Description of the Related Art

Software applications, such as computer-aided design (CAD) applications, are commonly used by architects, engineers, and other design professionals to aid in the creation, modification, analysis, and/or optimization of a design. Among other things, using software applications can substantially increase the productivity of the designer and/or improve the overall quality of a design. For example, a CAD application may be used to construct computer models representing real-world constructs, such as office buildings, airplanes, electronic appliances, and the like. The output of a software application also may include electronic files comprising a three-dimensional (3D) printable design that can be exported to a 3D fabrication device that fabricates a physical product.

Advances in software applications, as well as other types of software applications, have significantly increased the number and complexity of commands that may be invoked by users. However, a typical user may only understand and invoke only a small portion of the available commands in a modern design or other software application. The proficiency of a user in a particular software application may be measured by the user's pattern of command usage, including an amount of command usage (number of command invocations) for particular commands as well as the breadth of command usage (the range of invoked commands) across all available commands of the particular software application. Knowledge of the command usage patterns of the user as well comparisons to command usage patterns of other users and groups may be helpful for the user to understand his/her proficiency in using the software application.

Currently, a technical problem exists with respect to enabling a user to evaluate his/her command usage patterns for a particular software application. Conventionally, for a user to evaluate his/her command usage patterns, the user would have to access a program that logs/records command usage data for various users of the software application, process the command usage data in a manner that provides meaningful information about the command usage patterns of individual users and groups of users when using the software application, and present the information in a manner that allows the user to easily evaluate and comprehend his/her command usage patterns, as well as his/her command usage patterns in comparison to other users or groups. However, solutions that enable command usage information to be automatically collected, processed, and presented to users that allow users to easily evaluate their respective command usage patterns have not been developed.

Similarly, as a user becomes more advanced in using the commands of a given software application, the user may wish to take certification tests associated with the software application. However, there are currently no technical solutions developed for allowing a user to easily identify the certifications for which the user may be eligible.

In addition, to further advance a user's proficiency in using a software application, identifying commands that the user typically does not invoke, but should, is important. Identifying those commands to the user and prodding the user to start invoking those commands when using the software application can further develop the user's overall level of proficiency in using the software application. However, there are currently no technical solutions developed that identify commands that are recommended to a user but, for whatever reason, are not invoked by the user.

As the foregoing illustrates, what is needed in the art are more effective techniques for analyzing the proficiency of a user of a software application.

SUMMARY OF THE INVENTION

Various embodiments include a computer-implemented method for displaying a command map graphical user interface (GUI). The computer-implemented method includes receiving command usage data indicating how much a first user entity has used a set of commands of a software application. The computer-implemented method also includes displaying a command map graphical user interface (GUI) comprising a circle chart having a center. The computer-implemented further includes determining, for a first command included in the set of commands, a first distance from the center of the circle chart based on the command usage data, and displaying a first data point on the circle chart at the first distance to represent how much the first user entity has used the first command.

At least one technical advantage of the disclosed techniques relative to the prior art is that a computer device is enabled to generate and display a command map graphical user interface (GUI) that visually/graphically indicates an amount of usage (number of invocations) for various commands and command categories for a particular user or group of users. Another technical advantage is the disclosed techniques allow a user to easily evaluate and comprehend his/her command usage patterns, as well as compare his/her command usage patterns to other users and/or groups. Another technical advantage is the disclosed techniques allow user interactions with the computer device to be more efficient and effective in generating and displaying visualizations of the command usage patterns of users or groups, thus improving the functioning and operations of the computer device, relative to prior approaches. These technical advantages represent one or more technological advancements over prior art approaches.

Various embodiments include a computer-implemented method for displaying a graphical user interface (GUI). The computer-implemented method includes receiving command usage data indicating how much a user and a first user group has used a set of commands of a software application, wherein the user has not achieved a first certification and the first user group comprises a plurality of certified users who have achieved the first certification. The computer-implemented further includes comparing one or more command usage patterns of the user and the plurality of certified users of the first user group based on the command usage data, and displaying, within a graphical user interface (GUI), a first recommendation for the user to achieve the first certification based on the comparison.

At least another technical advantage of the disclosed techniques relative to the prior art is that a computer device is enabled to determine and display recommended certifications associated with the software application for a user based on the command usage patterns of the user and the command usage patterns of other users who have successfully passed the certifications. The recommended certifications may be displayed in the command map GUI or other type of GUI. Another technical advantage is the disclosed techniques allow a user to easily identify recommended certifications that the user is qualified to pass/achieve. Another technical advantage is the disclosed techniques allow user interactions with the computer device to be more efficient and effective in determining and displaying recommended certifications for the user, thus improving the functioning and operations of the computer device, relative to prior approaches. These technical advantages represent one or more technological advancements over prior art approaches.

At least another technical advantage of the disclosed techniques relative to the prior art is that a computer device is enabled to determine and display commands that are presently unused by a current user but are recommended for the user based on the command usage patterns of the current user and command usage patterns of users that are similar to the current user. The recommended commands may be displayed in the command map GUI or other type of GUI. Another technical advantage is the disclosed techniques allow a user to easily identify unused commands that the user should invoke to advance the user's overall proficiency in the software application. Another technical advantage is the disclosed techniques allow user interactions with the computer device to be more efficient and effective in determining and displaying recommended commands for the user, thus improving the functioning and operations of the computer device, relative to prior approaches. These technical advantages represent one or more technological advancements over prior art solutions.

As a practical application, the disclosed techniques may be implemented within a company or other enterprise having a server-client architecture. A central server may receive and log command usage data for a plurality of clients (e.g., employees) within the enterprise and provide command usage data for each client, which then generates and displays the command map GUI based on the command usage data. As another practical application, the disclosed techniques may be implemented outside an enterprise via a cloud-based service that implements a cloud server connected to a plurality of clients (e.g., subscribers of the cloud-based service). The cloud server may receive and log command usage data for the clients and provide command usage data for each client, which then generates and displays the command map GUI based on the command usage data.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 2 is a conceptual diagram of a command map table, according to various embodiments of the present invention;

DETAILED DESCRIPTION

Figure 1:
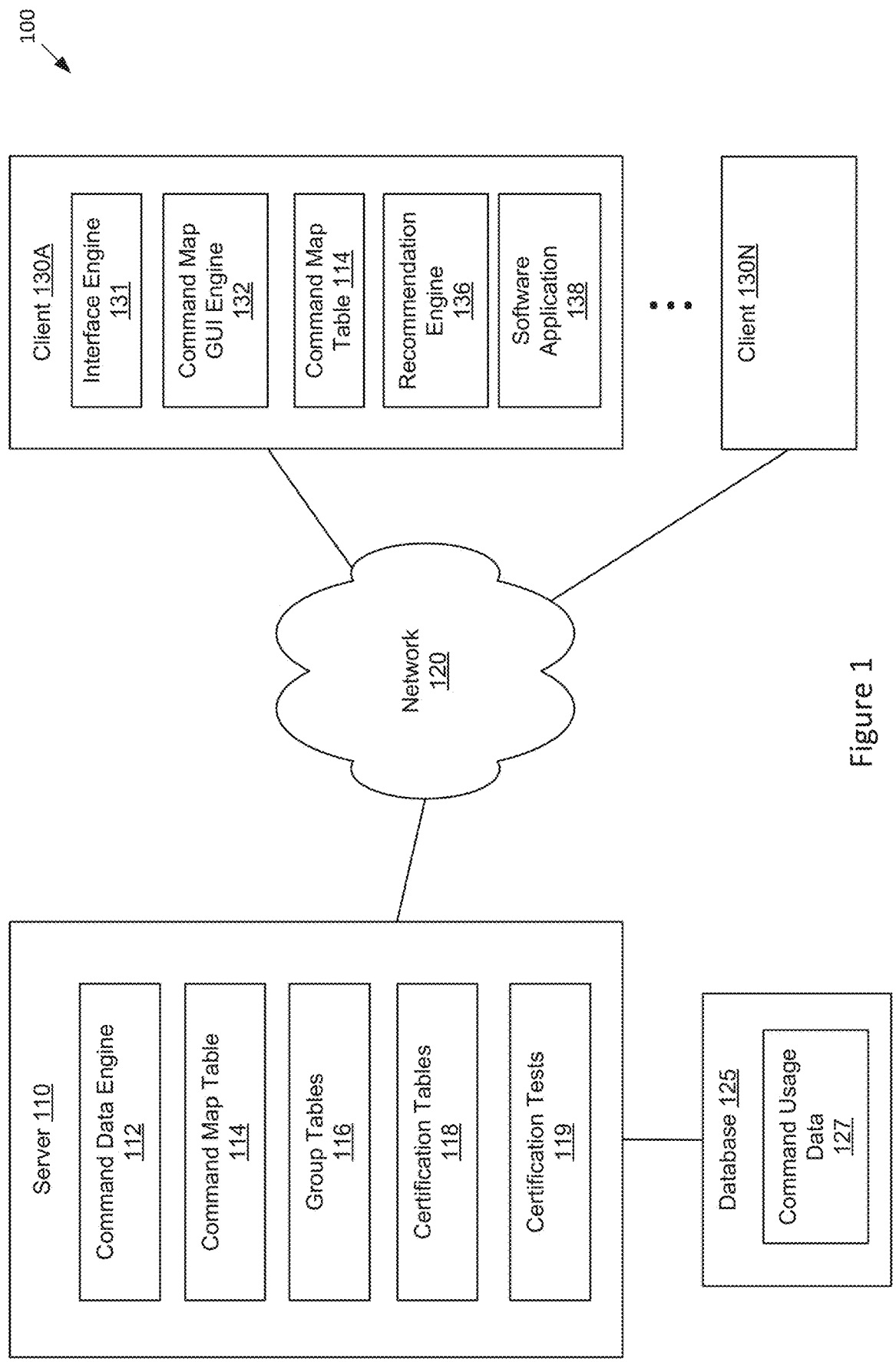
FIG. 1 illustrates a command map system configured to implement one or more aspects of the present invention.

In the following description, numerous specific details are set forth to provide a more thorough understanding of the various embodiments. However, it will be apparent to one of skilled in the art that the inventive concepts may be practiced without one or more of these specific details.

As used herein, an "entity" may comprise an individual user or a group of two or more users.

As used herein, a "command" of a software application may comprise a specific command that is provided and enabled by the software application. A user of the software application may use/perform the command by invoking/executing the command. Each performance of the command by the user may count as a single invocation/execution of the command by the user.

As used herein, a "command category" of a software application may comprise a grouping of two or more related commands of the software application. The grouping of two or more commands may be determined based on any logical relationship between the two or more commands, for example, as determined by a server administrator. Examples of command categories include model, render, drawing, sketch, animation, mesh, surface, simulation, and the like. In other embodiments, the command categories of a software application include other types of command categories.

As used herein, an "invocation value" may indicate various values depending on the context used. In general, an invocation value of a command or command category indicates the amount of usage of the command or command category. For a user, the invocation value of a command may indicate the total number of times/instances the command has been invoked/executed by the user. For a user, the invocation value of a command category may indicate the average number of times the commands of the command category have been invoked by the user (e.g., the total number of times all commands of the command category have been invoked divided by the total number of commands in the command category). For a group of two or more users, the invocation value of a command may indicate the average number of times the command is invoked by the users in the group (e.g., the total number of times the command is invoked by all users in the group divided by the total number of users in the group). For a group of two or more users, the invocation value of a command category may indicate the average number of times the commands of the command category are invoked by the users of the group (e.g., as calculated by determining the average number of invocations for commands in the command category for each user, summing the average numbers for all users in the group, and dividing the summed total by the total number of users in the group).

As used herein, a "distance" or "width" may be measured in predetermined units. For example, a "distance" or "width" may be measured in a number of pixels.

As used herein, a "distance from center" for a given point in a circle chart may refer to a distance from the given point to a perimeter of a center inner circle of the circle chart, as measured by a line connecting the given point to a center point of the circle chart.

As used herein, a "table" may comprise any type of data container, such as a data file, document, or the like.

As used herein, an "command usage data" may indicate different types of information regarding usage of commands and command categories by an entity depending on the context used. For example, command usage data may include command event data that describe particular instances of invoked commands by various users. As another example, command usage data may indicate compiled information regarding the command usage and/or command category usage of a particular group, as stored to a group table or certification table.

As used herein, a "different appearance" between a first element and a second element indicates that the displayed appearance of the first element is different than the displayed appearance of the second element in at least one display characteristic, such as color, texture, shading, pattern, line form, and the like.

As disclosed in the embodiments herein, a GUI system generates and displays a command map GUI that visually/graphically illustrates command usage patterns of a first entity (a user or group) and/or a comparison between the command usage patterns of the first entity and a second entity (another user or group). The GUI system may operate in two phases: a data collection phase and a runtime phase.

During the data collection phase, the GUI system collects, at a server, command usage data for a plurality of clients/users connected to the server. Each client may execute a software application while a user invokes/executes particular commands of the software application. In general, the software application may provide and enable a plurality of command categories, each command category comprising a plurality of related commands. Each client may capture command usage data (command event data) for each instance of an invoked/executed command by the user, and transmit the command usage data to the server. The server receives command usage data from the various clients/users and stores the received command usage data to a database. The command event data regarding each invoked command may include a unique identifier for the user (user ID), a unique identifier for the invoked command (command ID), and a timestamp. Each client also stores a command map GUI engine and a command map table comprising a plurality of parameters for generating a command map GUI.

During the runtime phase, a client executes the command map GUI engine, which generates and displays the command map GUI based on the command map table. Via the command map GUI, a current user selects to view the command usage data for a first entity, such as the current user, another user, or a group. In response, the client queries the server for command usage data for the first entity. In response, the server retrieves the relevant command usage data for the first entity and transmits the command usage data in a response to the client. The client then generates and displays the command map GUI based on the received command usage data and the command map table.

In some embodiments, the command map GUI displays a circle chart comprising a plurality of segments, each segment corresponding to and representing a particular command category of the software application. The command map GUI may also display a wedge inside each segment for representing the usage by the first entity of the command category corresponding to the segment. In particular, the size of each wedge graphically/visually illustrates the amount of usage of the corresponding command category by the first entity. For a first entity comprising a user, the wedge may visually illustrate the average number of invocations for the commands in the command category that have been performed by the user. For a first entity comprising a group of users, the wedge may represent the average number of invocations for the commands in the command category that have been performed by the users in the group.

In some embodiments, within the circle chart, the command map GUI displays a plurality of data points (e.g., small dots). Each data point corresponds to and represents a particular command of a particular command category. A data point that represents a command may be displayed within the segment that represents the command category that includes the command. In some embodiments, the distance of a particular data point from the center of the circle chart graphically/visually illustrates the amount of usage of the corresponding command by the first entity. For a first entity comprising a user, a data point may represent the total number of invocations for the corresponding command by the user. For a first entity comprising a group of users, the data point may represent the average number of invocations for the corresponding command by the users of the group.

During the runtime phase, the user may also select to view the command usage data of the first entity in comparison to a second entity (a user or group). In response, the client queries and receives from the server the command usage data for the first entity and the second entity. The client then generates and displays the command map GUI based on the received command usage data for the first and second entities and the command map table. In some embodiments, the command map GUI displays a first wedge inside each segment for visually illustrating the usage of the corresponding command category by the first entity and a second wedge inside each segment for visually illustrating the usage of the corresponding command category by the second entity. The second wedge may be displayed with a different appearance than the first wedge to allow the user to easily distinguish between the first wedge and the second wedge. In these embodiments, the first and second wedges may be displayed in a segment simultaneously to allow easy visual comparison of the command category usage between the first and second entities.

The command map GUI may also display a plurality of data points within the circle chart, each data point visually representing the amount of usage of a corresponding command for the second entity. In some embodiments, the data points are not displayed for the first entity to avoid visual clutter in the circle chart. In these embodiments, a data point is displayed with a particular visual appearance to indicate whether the first entity has used the corresponding command more than or less than the second entity. A data point representing a command may be displayed with a first appearance (e.g., colored blue) to indicate that the first entity has invoked the command a greater number of times than the second entity. The data point may be displayed with a second appearance (e.g., colored red) to indicate that the first entity has invoked the command a fewer number of times than the second entity, wherein the second appearance has a different appearance than the first appearance. In these embodiments, the data points may be displayed with the different appearances to allow easy visual comparison of the command usage between the first and second entities.

In this manner, the disclosed techniques enable the GUI system to generate and display a command map GUI that visually illustrates an amount of usage for commands and command categories by a first entity. The disclosed techniques further enable the GUI system to generate and display a command map GUI that visually illustrates a comparison between an amount of usage for commands and command categories between a first entity and a second entity. Thus, the disclosed technique provides a technological improvement and technological advancement over prior approaches as the disclosed technique generates and displays the command map GUI for allowing a user to easily evaluate and comprehend his/her command usage patterns and/or compare his/her command usage patterns to other users or groups.

In further embodiments, a GUI may determine and display one or more certifications associated with the software application that are recommended for a user. In these embodiments, certifications are recommended for a user based on the command usage patterns of the user and the command usage patterns of other users who have successfully passed the certifications. The recommended certifications may be displayed in the command map GUI or other type of GUI. Thus, the disclosed technique provides a technological improvement and technological advancement over prior approaches as the disclosed technique determines and displays recommended certifications for allowing a user to easily identify certifications that the user is qualified to pass.

In further embodiments, a GUI may also determine and display one or more unused commands that are recommended for a current user. In these embodiments, unused commands are recommended based on the command usage patterns of the current user and command usage patterns of users that are similar to the current user. The recommended commands may be represented as data points that are displayed on a circle chart. The distance of each data point from the center of the circle chart may graphically/visually represent the strength of the recommendation for the corresponding command for the current user. The recommended commands may be displayed in the command map GUI or other type of GUI. Thus, the disclosed technique provides a technological improvement and technological advancement over prior approaches as the disclosed technique determines and displays recommended commands for allowing a user to easily identify unused commands that the user should invoke to advance the user's overall proficiency in the software application.

Command Map System

FIG. 1 illustrates a command map system 100 configured to implement one or more aspects of the present invention. As shown, the command map system 100 includes a server 110 and a plurality of clients 130 (e.g., 130A-130N) coupled via a network 120. Each client/client 130 is associated with and corresponds to a particular user who operates the client 130. The network 120 may comprise any technically feasible communications or information network, wired or wireless, that allows data exchange, such as a wireless (Wi-Fi) network, personal area network (such as Bluetooth, Wireless USB, IrDA, etc.), wide area network (WAN), a local area network (LAN), and/or the Internet, among others.

The server 110 may comprise a computing device or machine, such as a server system, desktop computer, laptop computer, or any other type of computing device suitable for practicing various embodiments of the present invention. The client 130 may comprise a computing device or machine, such as a desktop computer, laptop computer, mobile device, or any other type of computing device suitable for practicing various embodiments of the present invention. The server 110 and client 130 comprise computer hardware components such as memory for storing software application(s) and data and processors that execute the software application(s) to provide processing engines that enable the operations and functions described herein. The computer hardware components of the server 110 and client 130 are discussed below in relation to FIGS. 21-22. In this regard, the server 110 hosts and executes a command data engine 112 and each client 130A-130N hosts and executes a command map GUI engine 132.

The server 110 executes a command data engine 112 and may store a command map table 114, at least one group table 116, at least one certification table 118, and at least one certification test 119 for performing embodiments herein. The server 110 may be connected to a database 125 that stores command usage data 127 received from the clients 130. The command data engine 112 may interact with the clients 130 for receiving and storing command usage data 127 to the database 125 during a data collection phase. The command data engine 112 may also respond to client queries for particular command usage data 127, the command map table 114, one or more group tables 116, one or more certification tables 118, and/or one or more certification tests 119 during a runtime phase.

Each client 130 executes an interface engine 131, a command map GUI engine 132, a recommendation engine 136, and a software application 138 and stores the command map table 114. The software application 138 may comprise any type of computer-based software application or suite. For example, the software application 138 may comprise a design application, such as a computer-aided design (CAD) application, computer-aided engineering (CAE) application, simulator application, modeler application, geometry generator application, a software engineering suite, or the like. In other embodiments, the software application 138 may comprise any other type of software application, other than design and/or engineering-based applications.

The interface engine 131 may act as an interface between the command data engine 112 executing on the server 110 and the various engines executing on the client 130 (such as the command map GUI engine 132, recommendation engine 136, and/or the software application 138). In this regard, the interface engine 131 may generate command event data describing commands being executed on the software application 138 and transmit the command event data to the command data engine 112 via the network 120. The interface engine 131 may also enable the command map GUI engine 132 and/or recommendation engine 136 to interact with the command data engine 112 via the network 120 for sending queries for particular information and then receiving responses containing the requested information from the command data engine 112. The requested information may include particular command usage data 127, the command map table 114, one or more group tables 116, one or more certification tables 118, and/or one or more certification tests 119 during a runtime phase. The client 130 may further execute the command map GUI engine 132 to generate and display the command map GUI based on the command map table 114 and the requested information received from the server 110, as described in the embodiments herein. The client 130 may further execute the recommendation engine 136 to generate and display embedded recommendations (such as recommended materials, recommended certifications, and/or recommended commands) within the command map GUI or any other type of GUI, as described in the embodiments herein.

FIG. 2 is a conceptual diagram of a command map table, according to various embodiments of the present invention. Each command map table 114 may store various parameters for generating the command map GUI. The command map table 114 may be stored to the server 110 and/or each client device 130 connected to the server 110. As shown, the command map table 114 comprises a first section 200 and a second section 250. The first section 200 may include parameters related to commands and command categories of the software application. The first section 200 may include a plurality of entries 201 (such as 201a, 201b, 201c, etc.), each entry 201 representing a command category of the software application. Each entry 201 for a command category may include different data fields for a name 205, a degree range 210, a set of commands 215, and a set of command degrees 220.

The name 205 may comprise the name or unique identifier of the command category (such as model, render, drawing, sketch, animation, etc.). The degree range 210 specifies a predetermined range of degrees that a segment representing the command category is displayed within the circle chart of the command map GUI. Thus, the degree range 210 also specifies the range of degrees that the wedge representing the amount of usage of the command category is displayed within the circle chart of the command map GUI. The degree range 210 specifies the position or orientation of the corresponding segment and wedge within the circle chart. For example, the degree range 210 for the model command category may specify a range of 0-45 degrees, whereby the segment and wedge representing the model command category is displayed at the position or orientation of 0-45 degrees within the circle chart. For example, the degree range 210 for the render command category may specify a range of 45-90 degrees, whereby the segment and wedge representing the render command category is then displayed at the position or orientation of 45-90 degrees within the circle chart.

The set of commands 215 for a command category may specify two or more identifiers of two or more commands (two or more command IDs) that are included in the command category. In these embodiments, each command category may comprise a plurality of different and distinct commands, each command being associated with a unique command identifier (command ID). The set of command degrees 220 may specify a set of degrees associated with the set of commands 215 of the command category. Each command degree is associated with a particular command and specifies a predetermined degree that the data point representing the particular command is displayed within the circle chart of the command map GUI. Thus, the command degree specifies the position or orientation of the corresponding data point within the circle chart. Each command degree included in the set of command degrees 220 may specify a degree that is within the degree range 210 specified for the corresponding command category. For example, the degree range 210 for the model command category may specify a range of 0-45 degrees, whereby each degree specified in the set of command degrees 220 is within the range of 0-45 degrees. For example, model command category (Category1) may include Command1a having an associated degree of 1, Command1b having an associated degree of 3, Command1c having an associated degree of 3, etc. Thus, a first data point representing Command1a is displayed at the position or orientation of 1 degree within the circle chart, a second data point representing Command1b is displayed at the position or orientation of 2 degrees within the circle chart, and a third data point representing Command1c is displayed at the position or orientation of 3 degrees within the circle chart.

The second section 250 may include parameters related to a set of bands displayed within the circle chart of the command map GUI. In some embodiments, the circle chart further comprises a center point, an inner center circle, and a set of two or more bands. The inner center circle is concentric with the circle chart (is centered at the center point) and has a predetermined radius that is significantly smaller than the radius of the circle chart. Each band may comprise a circular band that is concentric with the center circle and represents a particular level of user proficiency regarding commands and command categories of the software application. The second section 250 may be used by the command map GUI engine 132 to generate and display the set of bands within the circle chart. The set of bands is described in further detail in relation to FIG. 7.

The second section 250 may include a plurality of entries 251 (such as 251a, 251b, 251c, etc.), each entry 251 containing parameters for a particular band. Each entry 251 for a band may include data fields for a band name 255, a width range 260, a range of invocation values 265, and a pixel/value ratio 270. The band name 255 may comprise the name or identifier of the band (such as Level 1, Level 2, Level 3, etc.). The width range 260 specifies a predetermined range that the band is displayed within the circle chart. The width range 260 may be defined by a start width (in terms of distance from the center circle) and an end width (in terms of distance from the center circle). Thus, the width range 260 may specify a radius range for the band, ranging from the inner circle of the band to the outer circle of the band. For each band, the field for the range of invocation values 265 specifies the range of invocation values that the band represents. The range of invocation values 265 may be defined by a start invocation value (corresponding to the start width of the band) and an end invocation value (corresponding to the end width of the band). The field for the pixel/value ratio 270 specifies a number of pixels corresponding to each invocation value within the band. As discussed below, the pixel/value ratio 270 may be used by the command map GUI engine 132 to determine a distance from the center circle for displaying the wedges and/or data points. In some embodiments, the pixel/value ratio 270 may be different for each band in the plurality of bands.

Figure 3:
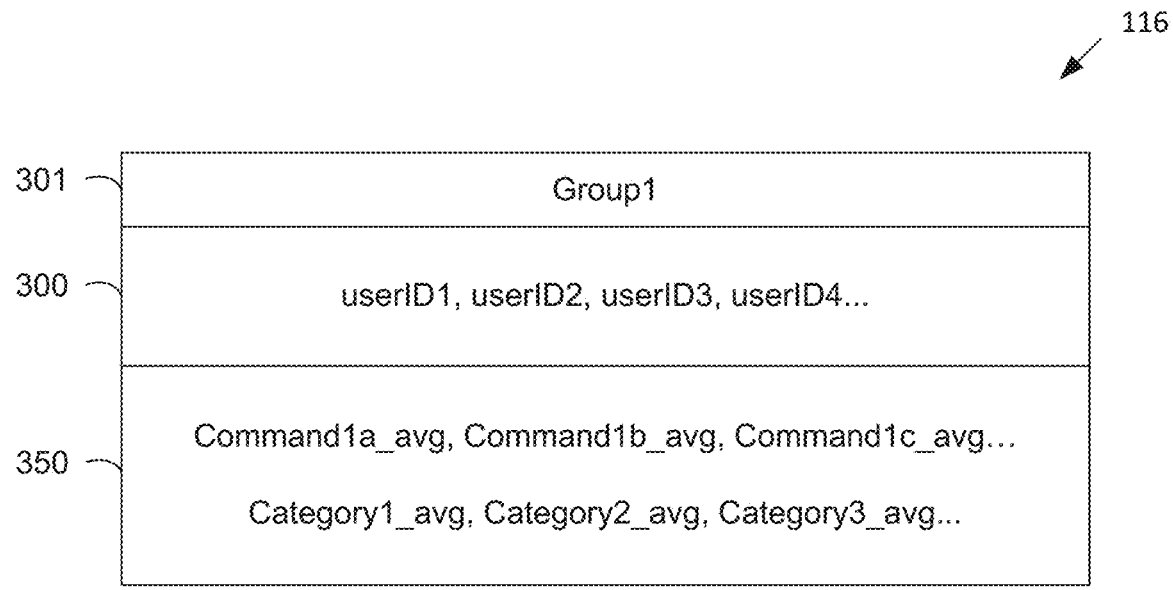
FIG. 3 is a conceptual diagram of a group table, according to various embodiments of the present invention.

FIG. 3 is a conceptual diagram of a group table, according to various embodiments of the present invention. In some embodiments, the server 110 stores a plurality of group tables 116, each group table 116 being stored for each defined group. A group may comprise two or more users that are grouped together based on some type of defining relationship. For example, a group may comprise users in a same industry field, department, project, team, company, classroom, and the like. For example, a group may comprise users having the same job title, job level, or educational background. In other embodiments, a group may be defined by any other type of relationship between the users. As shown, each group table 116 may comprise a field for the name or unique identifier 301 for the group. Each group table 116 may further comprise a first section 300 and a second section 350. The first section 300 may comprise a list of users included in the group, such as a list of user IDs and/or usernames (e.g., userID1, userID2, userID3, etc.).

The second section 350 of the group table 116 may include compiled command usage data for the users in the group, as processed by the command data engine 112 of the server 110. In some embodiments, the compiled command usage data may include a determined average amount of usage (average invocation value) for each command by the users in the group, such as Command1a_avg, Command1b_avg, Command1c_avg, etc. The compiled command usage data may further include a determined average amount of usage (average invocation value) for each command category across the users in the group, such as Category1_avg, Category2_avg, Category3_avg, etc. For example, the average amount of usage for a command category by the users in the group may be calculated by determining an average number of invocations for all commands in the command category for each user, adding/summing the average numbers for all users in the group, and dividing the summed total by the number of users in the group. As the command data engine 112 receives and processes command usage data from various clients 130, the command data engine 112 may continually update the compiled command usage data in the second section 350 accordingly.

Figure 4:
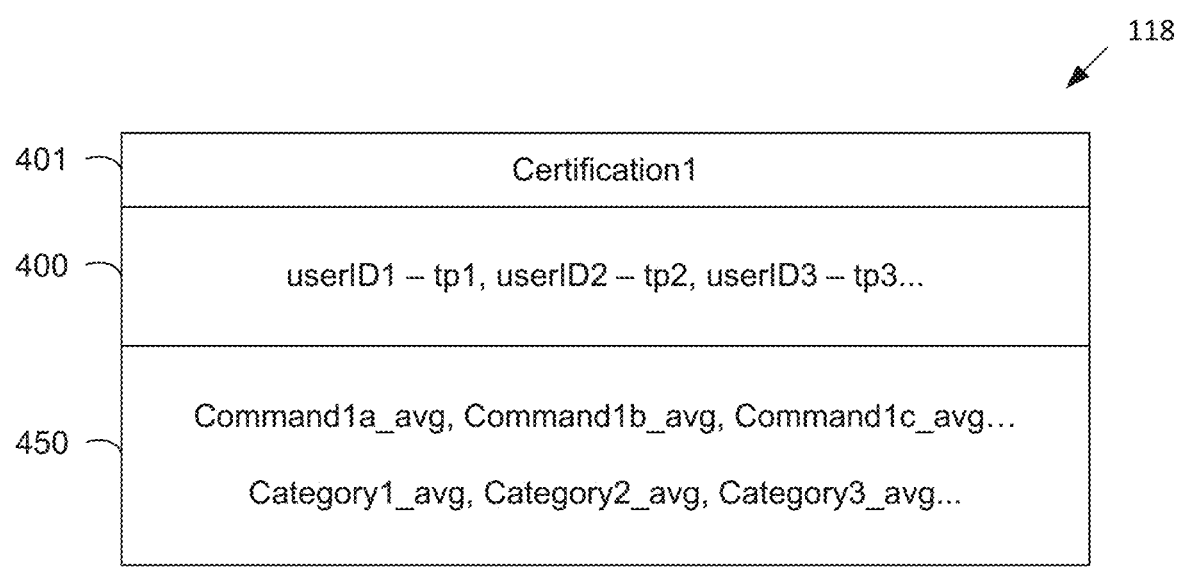
FIG. 4 is a conceptual diagram of a certification table, according to various embodiments of the present invention.

FIG. 4 is a conceptual diagram of a certification table, according to various embodiments of the present invention. In some embodiments, the server 110 stores a plurality of certification tables 118, each certification table 118 being stored for each certification available for the software application. As shown, each certification table 118 may comprise a field for the name or unique identifier 401 for the certification. Each certification table 118 may further comprise a first section 400 and a second section 450. The first section 400 may comprise a list of users and a timepoint associated with each user, such as a list of user IDs and/or usernames (e.g., userID1-tp1, userID2-tp2, userID3-tp3, etc.). Each user listed in the first section 400 may comprise a user who has passed a corresponding test 119 for the certification, whereby the associated timepoint indicates the date the user passed the certification test 119.

The command usage patterns of the users up to the timepoint the users passed the certification test 119 may provide valuable insights into the level of proficiency regarding the software application that is needed to pass the certification test. For each user listed in the first section 400, the command data engine 112 may retrieve and process the command usage data up to and including the date the user passed the certification test (as indicated by the associated timepoint). The processed command usage data may be stored in the second section 450 which includes compiled command usage data for the users who have passed the certification. In some embodiments, the compiled command usage data may include a determined average amount of usage (average invocation value) for each command by the users who passed the certification, such as Command1a_avg, Command1b_avg, Command1c_avg, etc. The compiled command usage data may further include a determined average amount of usage (average invocation value) for each command category across the users who have passed the certification, such as Category1_avg, Category2_avg, Category3_avg, etc. For example, the average amount of usage for a command category by the users may be calculated by determining an average number of invocations for all commands in the command category for each user, adding/summing the average numbers for all users who passed the certification, and dividing the summed total by the number of users who passed the certification.

Upon a new user passing the certification test 119 for a particular certification, the command data engine 112 may update the certification table 118 for the particular certification by adding the new user and the associated timepoint to the first section 400 of the certification table 118. The command data engine 112 may further update the certification table 118 by retrieving the command usage data for the new user up to and including the date the user passed the certification test, and updating the compiled command usage data in the second section 450 of the certification table 118 based on the new command usage data.

Data Collection Methods

Figure 5:
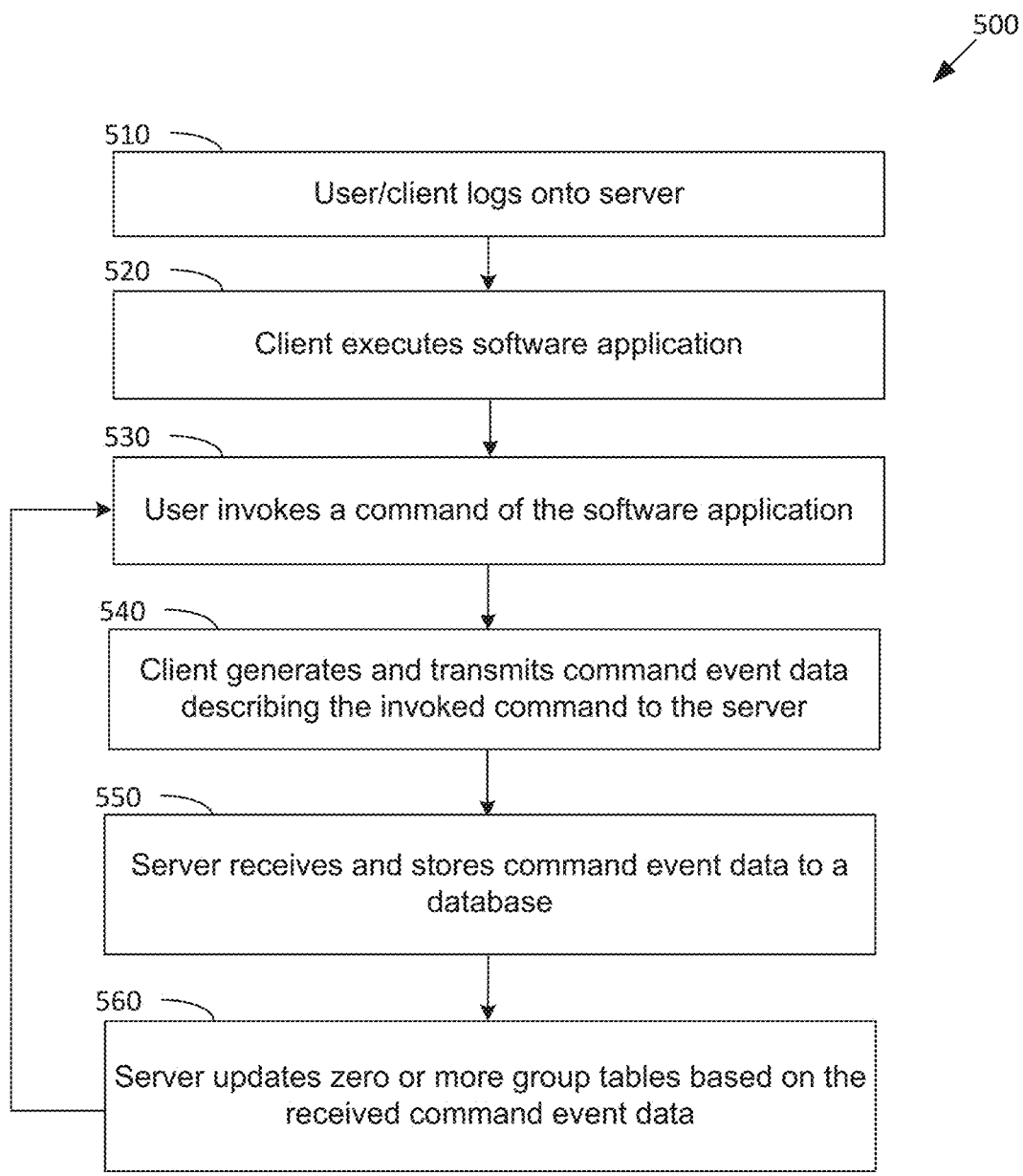
FIG. 5 is a flow diagram of method steps for command usage data collection, according to various embodiments of the present invention.

FIG. 5 is a flow diagram of method steps for command usage data collection, according to various embodiments of the present invention. Although the method steps are described in conjunction with the systems of FIGS. 1-4, persons skilled in the art will understand that the method steps can be performed in any order by any system. In some embodiments, the method 500 may be performed by the server 110 in conjunction with the plurality of clients 130 for receiving and storing command usage data 127 to the database 125.

The method 500 begins when a user/client 130 logs onto (at step 510) the command data engine 112 and the server 110, for example, using a user ID and password. The login process may be implemented by the interface engine 131 which interacts with the command data engine 112 via the network 120. The login process may trigger/initiate the generating and transmitting of command usage data by the interface engine 131 to the command data engine 112 via the network 120. The client 130 then executes (at step 520) a software application 138. A user invokes (at step 530) a command implemented by the software application. For each instance of each command that is invoked/executed by the user, the interface engine 131 may generate (at step 540) command event data describing the invoked command. The command event data may include, for example, a session ID, user ID, command ID, timestamp, and/or other data describing the invoked command. The interface engine 131 also transmits (at step 540) the command event data to the command data engine 112.

The command data engine 112 receives and stores (at step 550) the command event data to a database 125 coupled to the server 110. The command data engine 112 may also update (at step 560) zero or more group tables 116 based on the received command event data. If a particular group table 116 includes the user ID received in the command event data, the command data engine 112 may update the compiled command usage data in the particular group table 116. Thus, the command data engine 112 may update the average amount of usage for the command (e.g., Command1a_avg) that is specified by the command ID received in the command event data. The command data engine 112 may also update the average amount of usage for the command category (e.g., Category1_avg) that includes the command specified by the command ID received in the command event data. The appropriate command and command category may be determined using the command map table 114.

The method 500 continues at step 530, whereby another instance of a command is invoked/executed by the user. The method 500 may be performed for each client 130 connected with the server 110.

Figure 6:
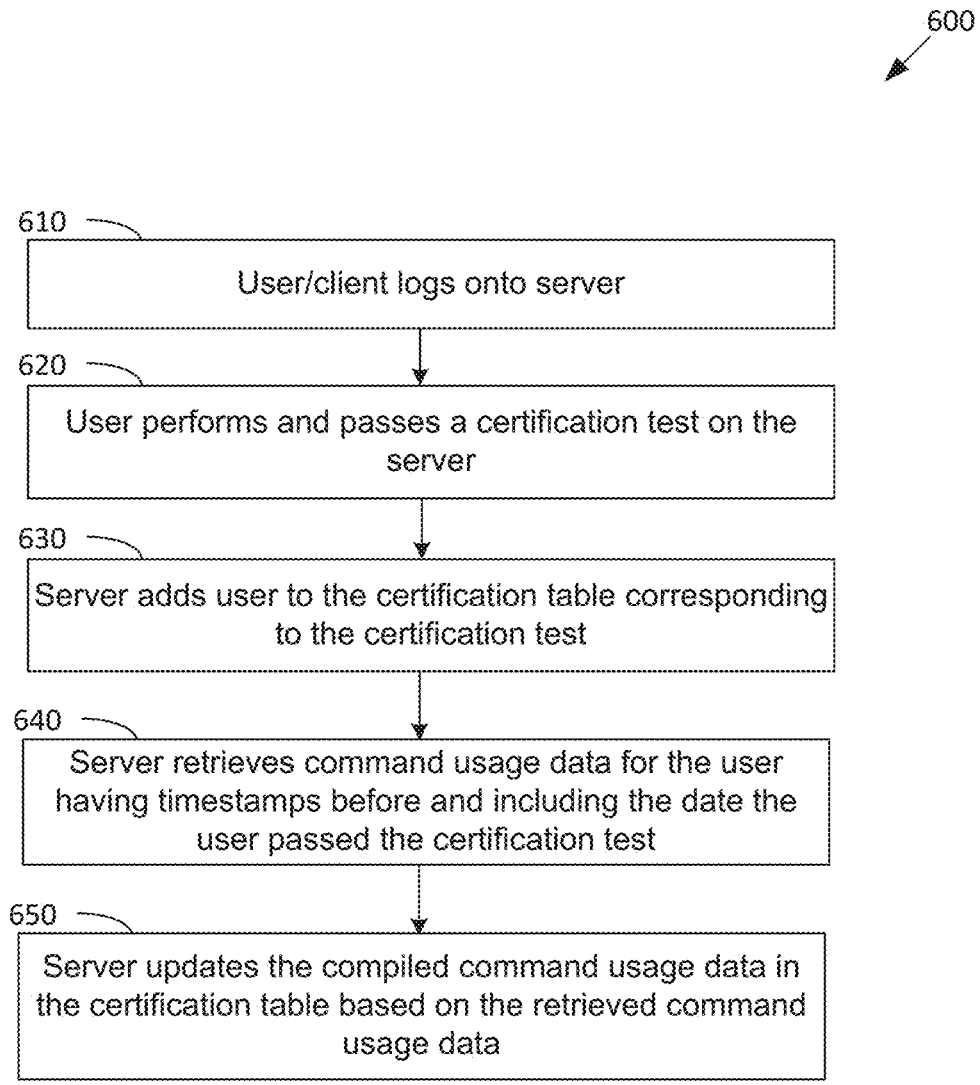
FIG. 6 is a flow diagram of method steps for collecting command usage data for a certification test, according to various embodiments of the present invention.

FIG. 6 is a flow diagram of method steps for collecting command usage data for a certification test, according to various embodiments of the present invention. Although the method steps are described in conjunction with the systems of FIGS. 1-4, persons skilled in the art will understand that the method steps can be performed in any order by any system.

The method 600 begins when a user/client 130 logs onto (at step 610) the command data engine 112 and the server 110, for example, using a user ID and password. The login process may be implemented by the interface engine 131 which interacts with the command data engine 112 via the network 120. The user may then perform and pass (at step 620) a test 119 for a particular certification residing on the server 110 or any other server. In response to the user passing the certification test 119, the command data engine 112 updates (at step 630) the certification table 118 for the particular certification by adding the user (user ID) and the timepoint (e.g., date) that the user passed the certification to the first section 400 of the certification table 118. The command data engine 112 then retrieves (at step 640) the command usage data 127 for the user having timestamps prior to and up to the date that the user passed the certification test. In these embodiments, any command usage data after the date the user passed the certification test is not retrieved and is not used to update the certification table 118. The command data engine 112 then updates (at step 650) the compiled command usage data in the second section 450 of the certification table 118 based on the retrieved command usage data. For example, the command data engine 112 may update the average amount of usage for each command and the average amount of usage for each command category based on the retrieved command usage data. The appropriate command and command category may be determined using the command map table 114.

The method 600 then ends. The method 600 may be performed for each client 130 connected with the server 110.

Command Map GUI

Figure 7:
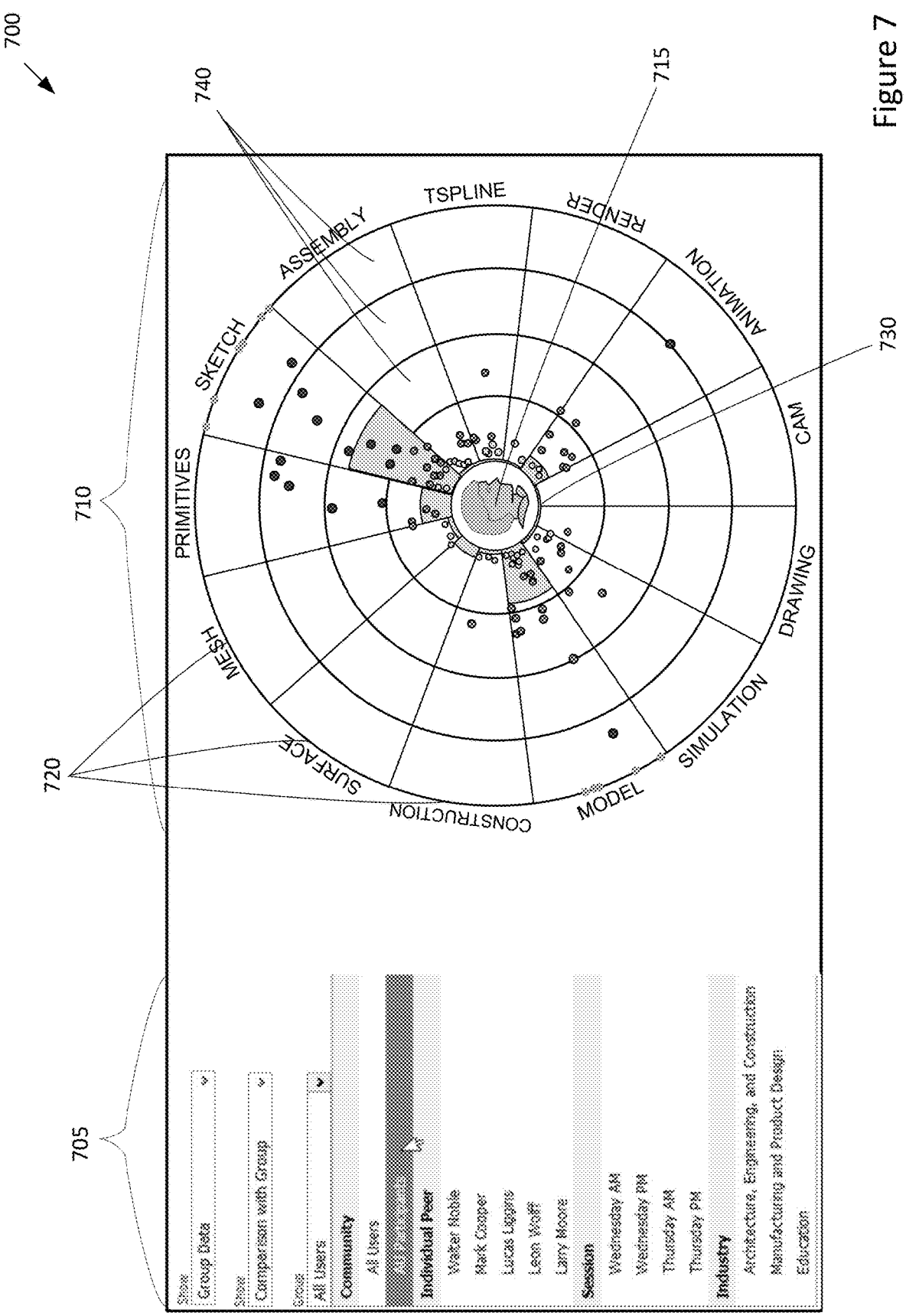
FIG. 7 is a screenshot of the command map GUI implemented in FIG. 1 for selecting user or group entities, according to various embodiments of the present invention.

During a runtime phase, a client 130 executes the command map GUI engine 132 which generates the command map GUI. FIG. 7 is a screenshot of the command map GUI implemented in FIG. 1 for selecting user or group entities, according to various embodiments of the present invention. As shown, the command map GUI 700 may display a data filter 705 for selecting command usage data for viewing. In some embodiments, via the data filter 705, a current user may select to view the command usage data for a first entity (user or a group). In other embodiments, via the data filter 705, the current user may select to view a comparison between the command usage data of the first entity and the command usage data of a second entity (user or a group).

For example, the current user may select to view the command usage data of the first entity comprising a specified user or group. In response to the user selection, the interface engine 131 executing on the client 130 may submit a query to the command data engine 112 executing on the server 110 for the command usage data for the first entity. As a default, the query does not specify a start timepoint and end timepoint for the command usage data and requests all command usage data that is available and stored for the first entity. In other embodiments, the start and end timepoints for the command usage data may be specified via the command map GUI, as discussed below in relation to FIG. 12.

If the first entity is a specified user, the command data engine 112 may respond to the query by retrieving command usage data for the specified user from the database 125 and transmitting the command usage data to the interface engine 131 of the client 130. If the first entity is a specified group, the command data engine 112 may retrieve command usage data from a group table 116 corresponding to the specified group and transmit the command usage data to the interface engine 131. Thus, for a specified group, the response from the server 110 may include compiled command usage data for the users in the group, such as an average amount of usage (number of invocations) for each command by the users in the group and an average amount of usage (number of invocations) for each command category across the users in the group. The command map GUI engine 132 then generates and displays the command map GUI based on the received command usage data and the command map table 114.

As shown in FIG. 7, the command map GUI 700 also displays a circle chart 710 comprising a plurality of segments 720, each segment 720 corresponding to a particular command category of the software application. The plurality of segments 720 together span across the entire 360 degree range of the circle chart 710, each segment 720 comprising a predetermined sub-portion (slice) of the circle chart 710. Each segment 720 has an associated range of degrees (a predetermined sub-range of 360 degrees) specified in the command map table 114, which defines the position/orientation of the segment 720 within the circle chart 710. The command map GUI 700 may also display the name of the command category adjacent to the segment 720 corresponding to the command category.

The circle chart 710 may further include a center point 715 and an inner center circle 730 having a predetermined radius. As used herein, a "distance" may be measured in a number of pixels. A "distance from center" for a given point on the circle chart 710 may refer to a distance from the perimeter of the center circle 730 to the given point, the distance being measured by a line connecting the center point 715 to the given point. In these embodiments, each distinct distance from center represents a distinct invocation value. For example, an invocation value may indicate a total number of invocations of a command for a user, an average number of invocations of a command for a group, an average number of invocations for a command category for a user, or an average number of invocations for a command category for a group. Each different invocation value may correspond to a particular distance from center on the circle chart 710. In general, greater distances from the center circle 730 represent higher invocation values, so that as the distance from center increases, the value of the corresponding invocation number also increases. In other embodiments, however, greater distances from the center circle 730 may represent lower invocation values, so that as the distance from center increases, the value of the corresponding invocation number decreases.

The circle chart 710 may further include a plurality of bands 740. As discussed above, the command map table 114 may include parameters used for generating and displaying the set of bands 740. Each band 740 may comprise a circular band (having an inner radius and an outer radius) that is concentric with the center circle 730 and represents a particular level of user or group proficiency with commands and command categories of the software application (such as Level 1, Level 2, Level 3, etc.). Each band 740 in the plurality of bands 740 may have the same band width (thickness) in terms of pixels. Each band 740 also has a predetermined width range defined by a start width (in terms of distance from the center circle 730) and an end width (in terms of distance from the center circle 730). The distance from the center circle 730 of the start width defines the inner radius of the band and the distance from the center circle 730 of the end width defines the outer radius of the band.

Each band 740 also represents a predetermined range of invocation values. The range of invocation values may be defined by a start invocation value (represented by the start width at the inner radius of the band) and an end invocation value (represented by the end width at the outer radius of the band). In some embodiments, the different ranges of invocation values represented by the plurality of bands 740 may be determined in a non-linear fashion, such that each band 740 represents a different total number of invocation values. For example, band1/level 1 may represent 0 to 9 invocations, band2/level 2 may represent 10 to 149 invocations, and band3/level 3 may represent 150 to 299 invocations. In other embodiments, however, the different ranges of invocation values for the plurality of bands 740 may be determined in a linear fashion, such that each band 740 represents the same total number of invocation values. For example, each band 740 may represent 100 different invocation values so that band1/level 1 represents 0 to 99 invocations, band2/level 2 represents 100 to 199 invocations, and band3/level 3 represents 200 to 299 invocations. In general, the different ranges of invocation values for the plurality of bands 740 may by predetermined by software designers to produce the proper scaling for an overall range of invocation values represented by the plurality of bands 740.

In some embodiments, within the width range of each band 740, the relationship between the distance from the center circle 730 (distance from center) and the corresponding invocation value that the distance represents comprises a linear relationship. In these embodiments, as the distance from center within the width range of the band increases, the invocation value also increases in a linear fashion. The linear relationship between the distance from center and the corresponding invocation value within the band may be defined by a pixel/value ratio, as specified in the command map table 114. In some embodiments, the pixel/value ratio may be different for each band in the plurality of bands. The pixel/value ratio may specify a number of pixels (distance) associated with a single increment of the invocation value. The pixel/value ratio may be determined by dividing the band width (in pixels) by the total number of different invocation values that are represented by the band. For example, if each band comprises a band width of 100 pixels, and the band represents 0 to 9 invocations (comprising 10 different invocation values represented by the band), the pixel/value ratio equals 10 (100/10). This ratio indicates that within the band, each single increment of the invocation value corresponds to an increase in the distance from center of 10 pixels. The pixel/value ratio may be used by the command map GUI engine 132 to determine a distance from the center circle corresponding to various invocation values, for displaying wedges (representing command categories) and data points (representing commands) in the circle chart 710.

As discussed above, the user may select to view the command usage data for a first entity via the data filter 705, and the client 130 may request for and receive command usage data for the first entity from the server 110. The command map GUI engine 132 then generates and displays a plurality of data points on the circle chart 710 of the command map GUI based on the received command usage data and the command map table 114.

Figure 8:
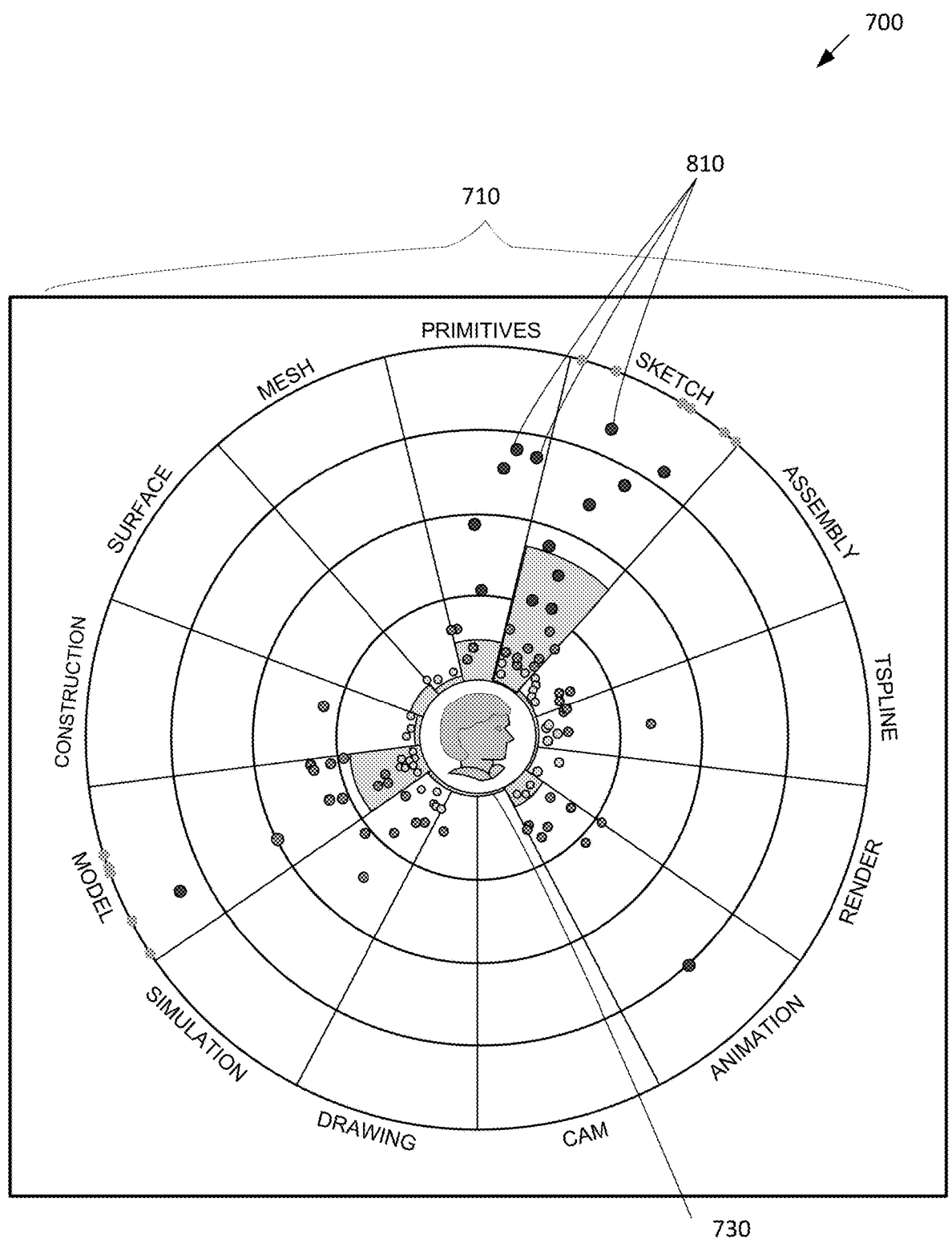
FIG. 8 is a screenshot of the command map GUI implemented in FIG. 1 displaying the command usage for a first entity, according to various embodiments of the present invention.

FIG. 8 is a screenshot of the command map GUI implemented in FIG. 1 displaying the command usage for a first entity, according to various embodiments of the present invention. As shown, the command map GUI 700 displays a plurality of data points 810 that graphically represent/illustrate the plurality of commands of the software application, each data point representing a particular command included within a particular command category. A data point that represents a command may be displayed within the segment that represents the particular command category that includes the command. The data point is displayed at a degree within the circle chart that is predetermined for the particular command, as specified in the command map table 114.

For a first entity comprising a specified user, the command map GUI engine 132 may analyze the received command usage data to determine an amount of usage (invocation value) for each command. The command map GUI engine 132 may do so using the command IDs included in the command usage data received for the specified user from the server 110. For a first entity comprising a specified group, the command map GUI engine 132 may analyze the received command usage data to determine an average amount of usage (invocation value) for each command by the users in the group. For each command having a determined invocation value, the command map GUI engine 132 may further determine a distance from center corresponding to the invocation value where the data point representing the command is to be displayed in the circle chart 710. The distance of a data point from the center circle 730 of the circle chart 710 visually represents/illustrates the amount of usage of the corresponding command for the first entity. For a first entity comprising a user, a data point may represent the total number of invocations for the corresponding command by the user. For a first entity comprising a group, the data point may represent the average number of invocations for the corresponding command by the users of the group.

The command map GUI engine 132 may use the command map table 114 to determine the distance from center for each invocation value determined for each command. To display a data point representing a particular command in the circle chart 710, the command map GUI engine 132 may first determine a distance from center corresponding to the determined invocation value. To do so, the command map GUI engine 132 may first determine which band 740 includes the invocation value by examining the range of invocation values represented by each band 740. The command map GUI engine 132 may then determine the distance from center within the particular band that corresponds to the particular invocation value. The command map GUI engine 132 may do so by determining a difference value between the particular invocation value and the start invocation value represented by the band 740, which equals the total number of value increments needed from the start invocation value to reach the particular invocation value. The command map GUI engine 132 may then multiply the pixel/value ratio for the band 740 by the difference value, which equals the pixel distance increase needed from the start width of the band 720 to reach the distance from center corresponding to the particular invocation value. The command map GUI engine 132 then adds the pixel distance increase to the start width of the band 720, which equals the distance from center corresponding to the particular invocation value.

For example, the invocation value for a particular command may equal 3, which is included in band1. Band1 represents 0 to 9 invocations, has a start width of 0 pixels, and a pixel/value ratio of 10. The difference value between 3 (the invocation value) and 0 (the start invocation value represented by band1) equals 3, and 10 (the pixel/value ratio for band1) multiplied by 3 (the difference value) equals 30. Adding 30 (the pixel distance increase) to 0 (the start width of band1) equals 30 pixels. Thus, the distance from center corresponding to the invocation value of 3 is determined to equal 30 pixels. Therefore, the command map GUI engine 132 displays a data point representing the particular command at a distance from center equal to 30 pixels and at a degree predetermined for the particular command, as specified in the command map table 114.

The command map GUI 700 may also display a wedge within each corresponding segment 720 for representing the amount of usage of the command category corresponding to the segment 720 by the first entity. In some embodiments, the wedges representing command categories and the data points representing commands are displayed simultaneously. In other embodiments, the wedges representing command categories and the data points representing commands are not displayed simultaneously to avoid visual clutter in the circle chart 700.

Figure 9:
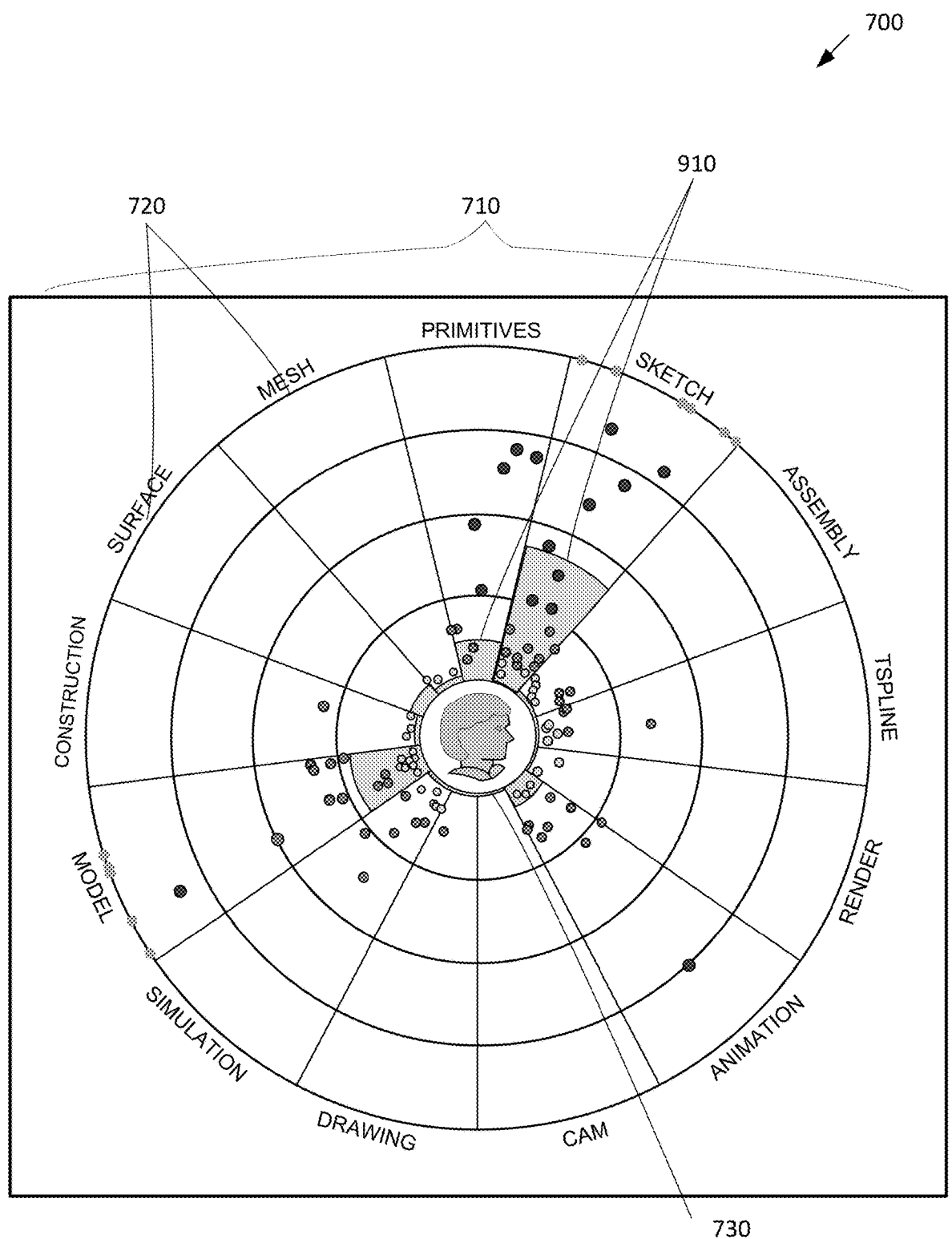
FIG. 9 is a screenshot of the command map GUI implemented in FIG. 1 displaying the command category usage for a first entity, according to various embodiments of the present invention.

FIG. 9 is a screenshot of the command map GUI implemented in FIG. 1 displaying the command category usage for a first entity, according to various embodiments of the present invention. As shown, the command map GUI 700 displays a plurality of wedges 910 that visually represent command categories of the software application, each wedge representing a particular command category comprising a plurality of different commands. A wedge 910 that represents a command category may be displayed within the segment 720 that corresponds to the command category at a degree range predetermined for the particular segment and command category, as specified in the command map table 114. The wedge may comprise a sub-portion or the entirety of the corresponding segment 720. Each wedge 910 may by displayed with a different appearance than the corresponding segment 720 to allow a user to easily distinguish between the wedge and the segment.

In particular, the size of each wedge 910 graphically represents/illustrates the amount of usage of the corresponding command category by the first entity, the larger the size of each wedge 910 representing a higher amount of usage of the corresponding command category. For a first entity comprising a user, the wedge 910 may represent the average number of invocations for the commands in the command category by the user. For a first entity comprising a group of users, the wedge 910 may represent the average number of invocations for the commands in the command category by the users of the group. Thus, each wedge 910 may visually represent the first entity's skill in a particular command category, whereas the plurality of wedges together visually represent the first entity's skill across all the command categories.

For a first entity comprising a specified user, the command map GUI engine 132 may analyze the received command usage data for the user to determine an average amount of usage (invocation value) for each command category. The command map GUI engine 132 may do so using the command IDs included in the command usage data and the command map table 114 to determine command categories for each invoked command. For a first entity comprising a specified group, the command map GUI engine 132 may analyze the received command usage data to determine an average amount of usage (invocation value) for the commands of the command category by the users in the group.

For each command category, the command map GUI engine 132 may further determine a distance from center corresponding to the invocation value determined for the command category. The same process described above for determining a distance from center for an invocation value determined for a command may be used to determine the distance from center for an invocation value determined for a command category. The distance from center determined for a particular command category determines the overall size or area of the wedge 910 representing the amount of usage of the particular command category. In particular, the area of each wedge 910 extends from the perimeter of the center circle 730 to the distance from the center circle 730 that is determined for the wedge 910, within the degree range that is predetermined for the wedge 910 and corresponding segment 720.

For example, the invocation value for a particular command category may equal 3, which is included in band1. Band1 may represent 0 to 9 invocations, have a start width of 0 pixels, and a pixel/value ratio of 10. The difference value between 3 (the invocation value) and 0 (the start invocation value represented by band1) equals 3, and 10 (the pixel/value ratio for band1) multiplied by 3 (the difference value) equals 30. Adding 30 (the pixel distance increase) to 0 (the start width of band1) equals 30 pixels, which equals the distance from center corresponding to the invocation value of 3. Thus, the command map GUI engine 132 displays a wedge 910 representing the particular command category in the circle chart 710 that extends from the perimeter of the center circle 730 to the distance from center equal to 30 pixels, within the degree range predetermined for the wedge 910.

During the runtime phase, the user may also select, via the data filter 705 of the command map GUI 700, to view a comparison between the command usage data of a first entity (user or group) and the command usage data of a second entity (user or group). In response, the client 130 queries and receives from the server 110 the command usage data for the first entity and the second entity. The client 130 then generates and displays the command map GUI based on the received command usage data for the first and second entities and the command map table 114. In particular, the command map GUI 700 may display a plurality of data points, each data point representing the amount of usage of a particular command for the second entity.

Figure 10:
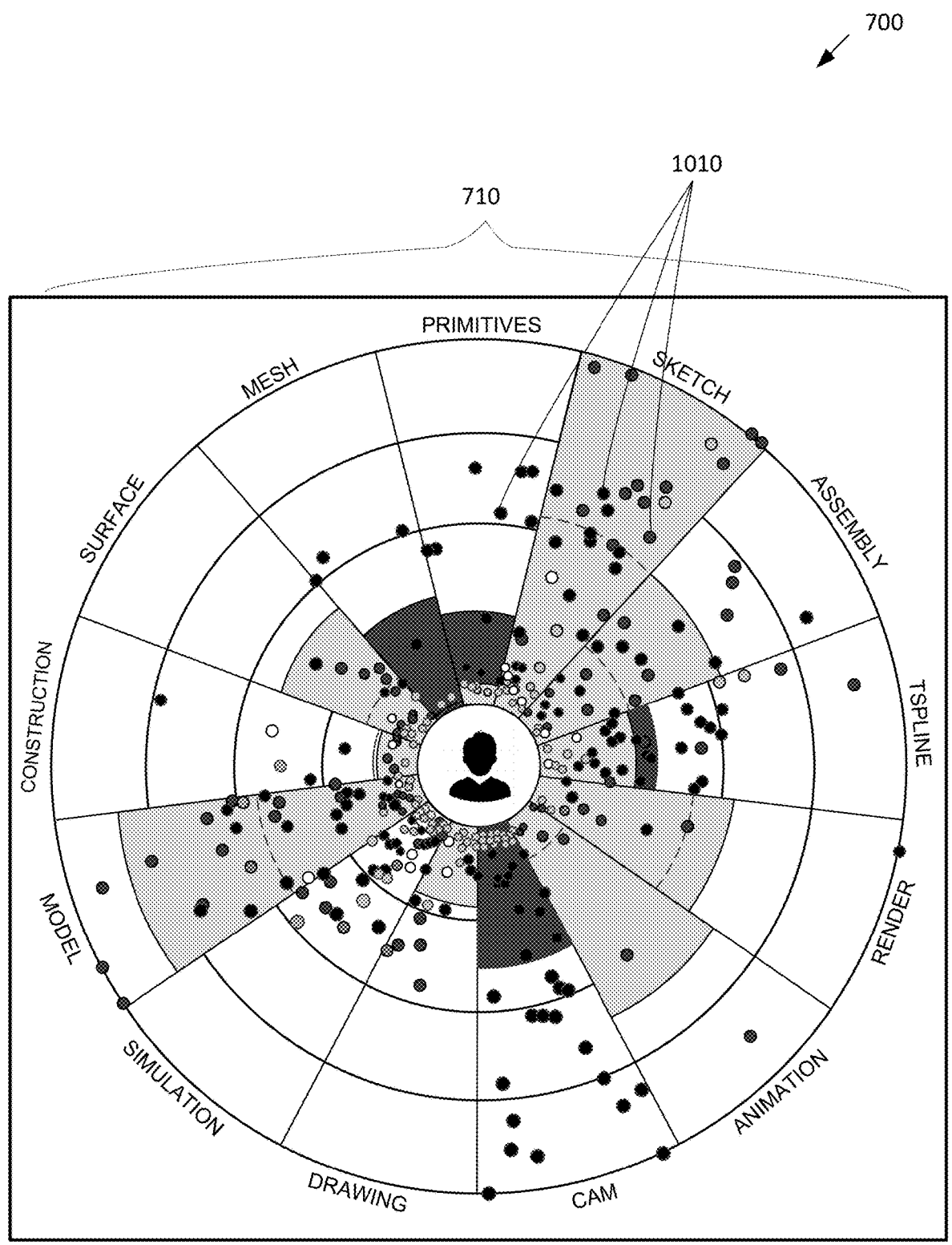
FIG. 10 is a screenshot of the command map GUI implemented in FIG. 1 displaying a comparison between command usage by a first entity and a second entity, according to various embodiments of the present invention.

FIG. 10 is a screenshot of the command map GUI implemented in FIG. 1 displaying a comparison between command usage by a first entity and a second entity, according to various embodiments of the present invention. As shown, the command map GUI 700 displays a plurality of data points 1010 that visually represent the command usage for a second entity. In some embodiments, the command map GUI 700 does not display data points for the first entity to avoid visual clutter in the command map GUI 700. In other embodiments, however, the command map GUI 700 displays a plurality of data points 1010 that visually represent the command usage for the first entity, and does not display data points for the second entity to avoid visual clutter in the command map GUI 700.

In these embodiments, the process for displaying the data points for the first entity or second entity is similar to the process for displaying the data points for the first entity as described above in relation to FIG. 8. However, in further embodiments, a data point 1010 representing a particular command may be displayed with at least two different and distinct appearances to indicate whether the first entity is using particular command more than or less than the second entity. For example, a data point 1010 representing a particular command may be displayed with a first appearance to indicate that the invocation value associated with the particular command for the first entity is greater than the invocation value associated with the particular command for the second entity. A data point 1010 representing a particular command may be displayed with a second appearance to indicate that the invocation value associated with the particular command for the first entity is less than the invocation value associated with the particular command for the second entity, wherein the second appearance is different than the first appearance in at least one visual characteristic. If an entity comprises a user, the invocation value for the particular command for the user may comprise the total number of times the particular command was invoked by the user. If an entity comprises a group, the invocation value for the particular command for the group may comprise an average number of times the particular command was invoked by the users of the group.

For example, a data point 1010 representing a particular command may be colored blue to indicate that the invocation value associated with the particular command for the first entity is greater than the invocation value associated with the particular command for the second entity. A data point 1010 representing a particular command may be colored red to indicate that the invocation value associated with the particular command for the first entity is less than the invocation value associated with the particular command for the second entity. In these embodiments, the data points may be displayed with the different appearances to allow easy visual comparison of the command usage between the first and second entities.

Figure 11:
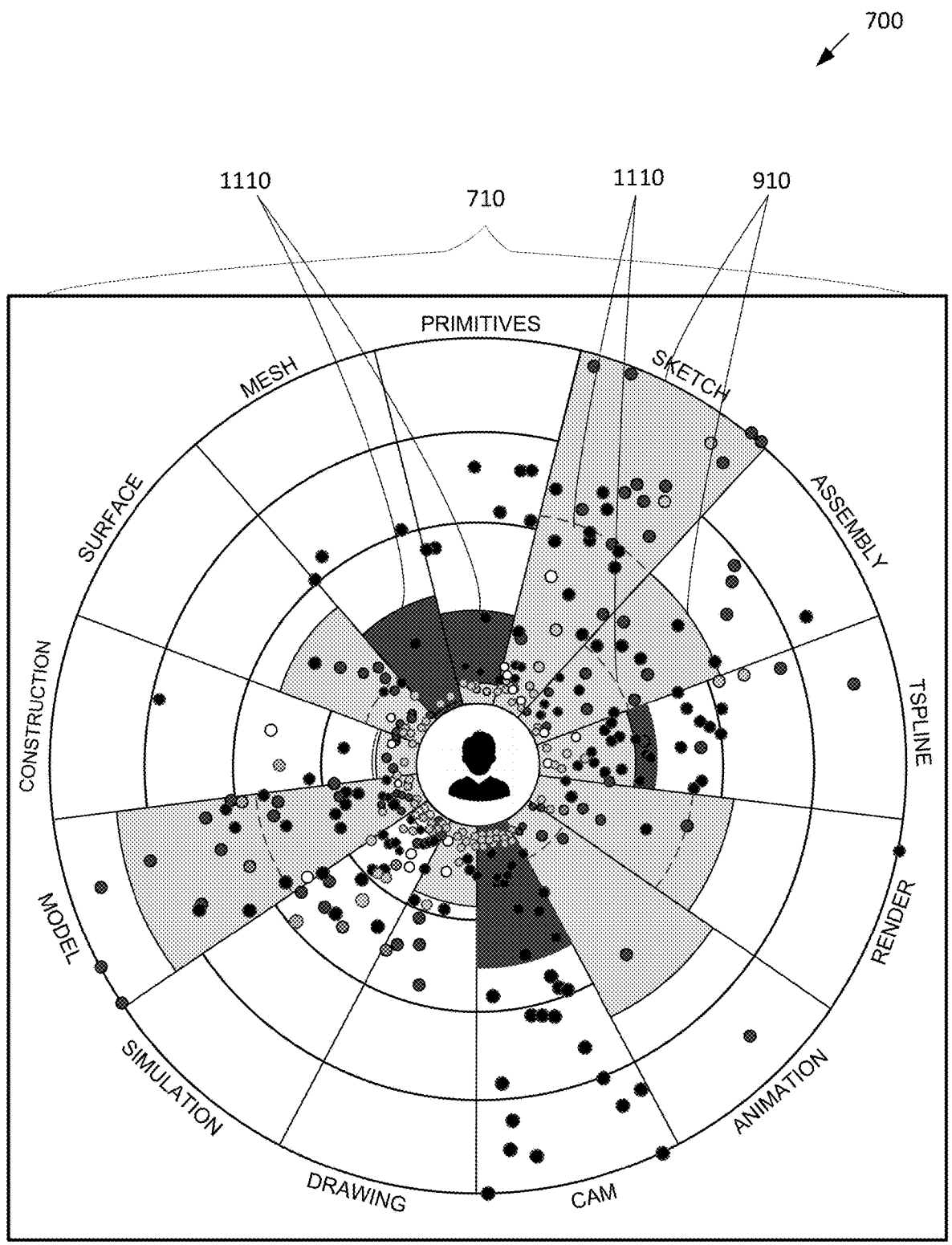
FIG. 11 is a screenshot of the command map GUI implemented in FIG. 1 illustrating a comparison between command category usage by a first entity and a second entity, according to various embodiments of the present invention.

To further illustrate the comparison between the command usage data of the second entity and the first entity, the command map GUI may also display a plurality of wedges representing the amount of command category usage by the second entity that overlap the plurality of wedges representing the amount of command category usage by the first entity. FIG. 11 is a screenshot of the command map GUI implemented in FIG. 1 illustrating a comparison between command category usage by a first entity and a second entity, according to various embodiments of the present invention. As shown, the command map GUI may display a first wedge 910 inside each segment 720 representing the amount of usage of the corresponding command category by the first entity and a second wedge 1110 inside each segment 720 for representing the amount of usage of the corresponding command category by the second entity. Thus, the first wedge 910 and the second wedge 1110 may be overlaid on top of each other within the corresponding segment 720. However, the second wedge 1110 representing the command category usage of the second entity may be displayed with a different appearance than the first wedge 910 representing the command category usage of the first entity to visually distinguish the second wedge from the first wedge. In these embodiments, the first and second wedges may be displayed in a segment simultaneously to allow easy visual comparison between the command category usage by the first and second entities.

Figure 12:
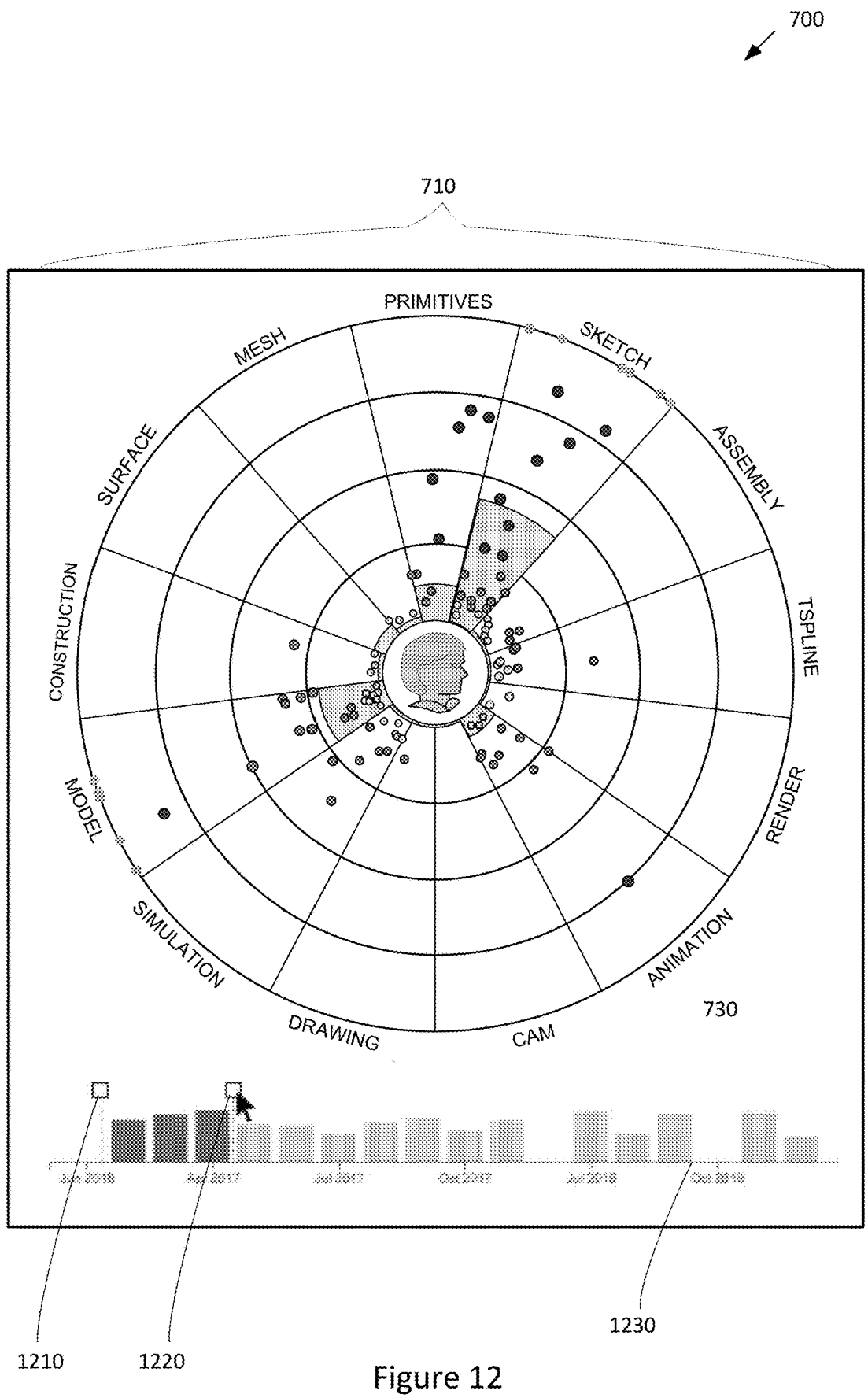
FIG. 12 is a screenshot of the command map GUI implemented in FIG. 1 for selecting timepoints for command usage data, according to various embodiments of the present invention.

During a runtime phase, the command map GUI may also enable a user to select specific start and end timepoints for the command usage data the user wishes to view for the first entity and/or second entity. FIG. 12 is a screenshot of the command map GUI implemented in FIG. 1 for selecting timepoints for command usage data, according to various embodiments of the present invention. As shown, the command map GUI 700 may display a first timepoint selector 1210 for selecting a start timepoint and a second timepoint selector 1220 for selecting an end timepoint for the command usage data. The timepoint selectors may comprise, for example, selectable sliders that may be dragged horizontally along a displayed timeline 1230 to select a particular timepoint along the timeline 1230.

In some embodiments, when a user selects the first entity and/or second entity via the data filter 705, in response the command map GUI engine 132 determines that the requested command usage data includes all command usage data that is available for the first entity and/or second entity as a default, and the client 130 queries the server 110 for all the command usage data available for the first entity and/or second entity. However, if the user selects specific start and end timepoints for the first entity and/or second entity via the timepoint selectors 1210 and 1220, in response the command map GUI engine 132 queries the server 110 only for the command usage data for the first entity and/or second entity that falls within the specified start and end timepoints. Thus, the client 130 requests command usage data for the first entity and/or second entity having associated timestamps that fall within the specified start and end timepoints. The server 110 then responds by retrieving and returning command usage data for the first entity and/or second entity having associated timestamps that fall within the specified start and end timepoints. The by the command map GUI engine 132 receives the command usage data, and processes and displays the command usage data in the command map GUI 700 in the same manner as discussed above for queries that do not include specific start and end timepoints.

Figure 13A:
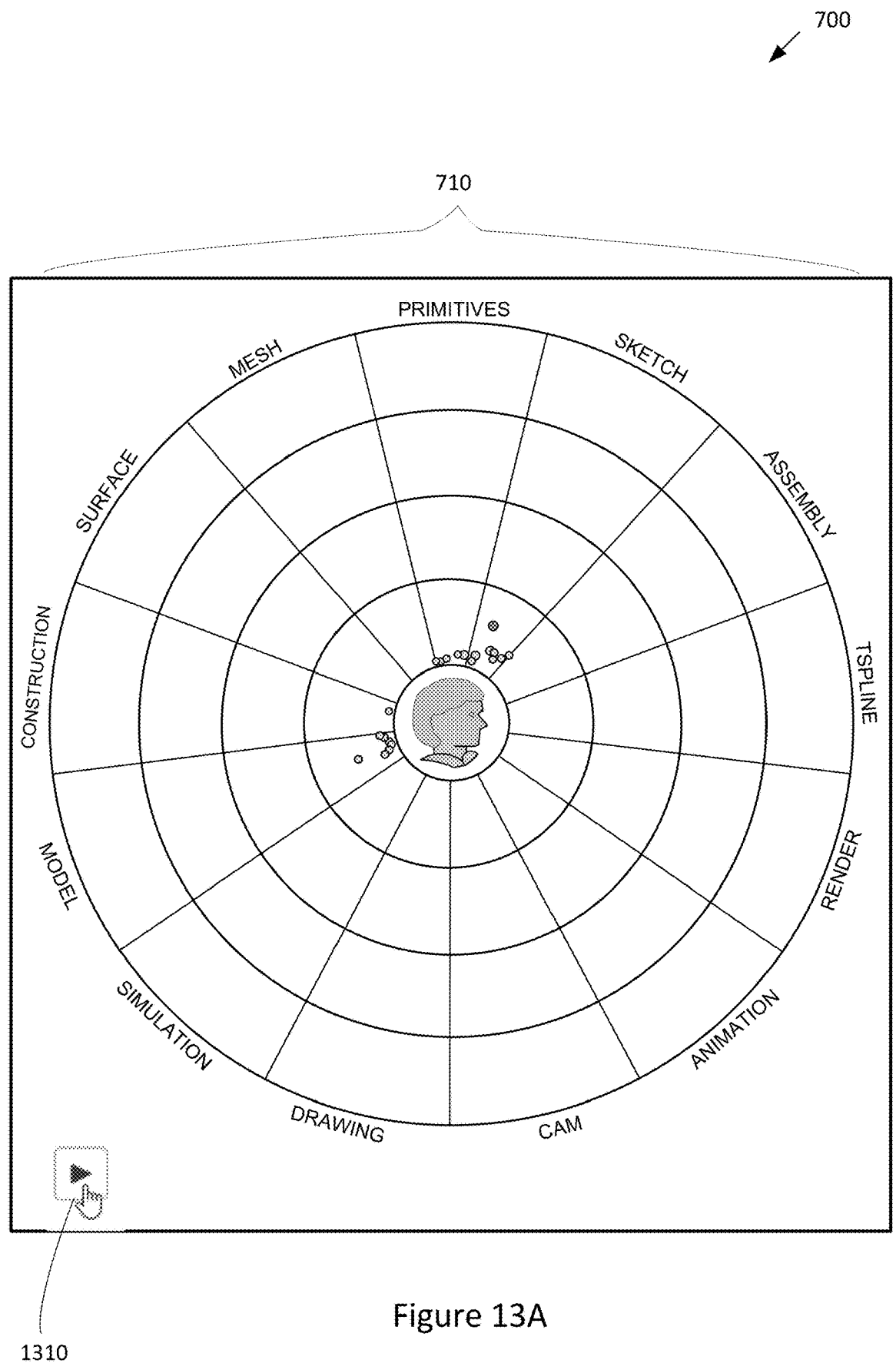
FIG. 13A is a screenshot of the command map GUI implemented in FIG. 1 displaying a first snapshot of the animation feature, according to various embodiments of the present invention.

During a runtime phase, the command map GUI may also enable a user to select a time animation feature for displaying a series of snapshots illustrating the progression of a selected entity's proficiency in command usage of the software application over time. FIG. 13A is a screenshot of the command map GUI implemented in FIG. 1 displaying a first snapshot of the animation feature, according to various embodiments of the present invention. As shown, the command map GUI 700 may display an animation selector 1310 for initiating the animation feature for the first entity. In response, the command map GUI engine 132 automatically performs a sequence of operations that generates and displays a plurality of snapshots without receiving any further inputs from the user, each snapshot illustrating the command usage of the first entity for different periods of time.

In particular, upon receiving the selection of the animation feature for the first entity, the command map GUI engine 132 queries the server 110 for the command usage data for the first entity for a first time period, such as the first day the server 110 began storing command usage data for the first entity. Thus, the query to the server 110 may specify a start timepoint of t0 and an end timepoint of t0, whereby t0 corresponds to the first day that the first entity began using the software application and command usage data is logged to the server 110. As shown in FIG. 13A, the command map GUI 700 then generates and displays a first snapshot comprising a plurality of data points that visually illustrate the command usage of the first entity and a plurality of wedges that visually illustrate the command category usage of the first entity for the timepoint of t0.

Figure 13B:
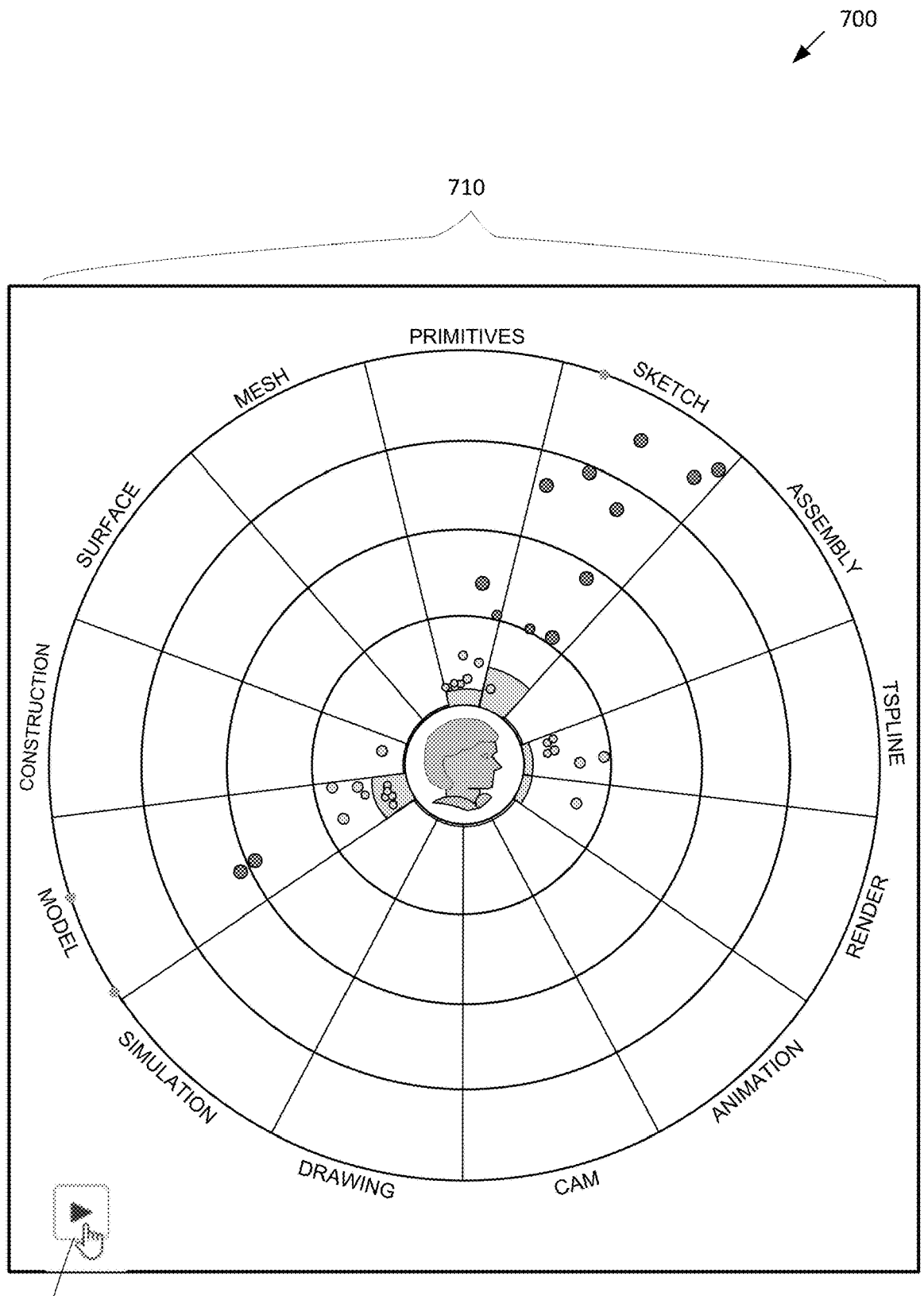
FIG. 13B is a screenshot of the command map GUI implemented in FIG. 1 displaying a second snapshot of the animation feature, according to various embodiments of the present invention.

The command map GUI 700 may display the first snapshot for a predetermined time interval (e.g., 3 seconds) before displaying a next snapshot of the data points and wedges for the first entity. During the predetermined time interval, the command map GUI engine 132 queries the server 110 for the command usage data for the first entity for a second time period from start timepoint t0 to end timepoint t1. In some embodiments, the end timepoint t1 may be identified using a time increment X that is predetermined for the animation feature, such as one month. Thus, for generating the second snaphot, the command map GUI engine 132 queries the server 110 for the command usage data for the first entity for a time period from t0 to X. FIG. 13B is a screenshot of the command map GUI implemented in FIG. 1 displaying a second snapshot of the animation feature, according to various embodiments of the present invention. As shown, the command map GUI 700 then generates and displays the second snapshot comprising a plurality of data points that visually illustrate the command usage of the first entity and a plurality of wedges that visually illustrate the command category usage of the first entity for the second time period between t0 and t1.

Figure 13C:
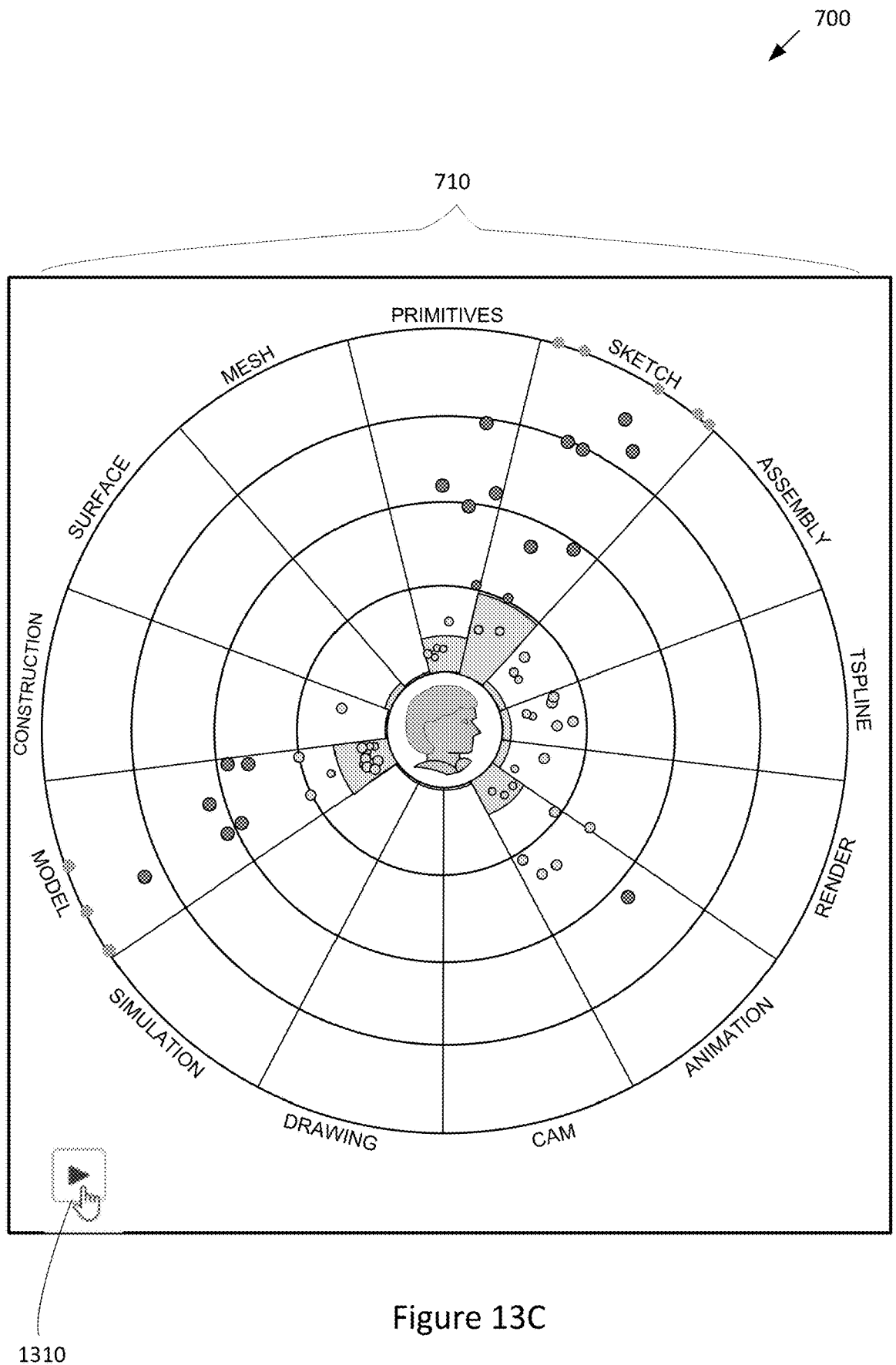
FIG. 13C is a screenshot of the command map GUI implemented in FIG. 1 displaying a third snapshot of the animation feature, according to various embodiments of the present invention.

The command map GUI 700 may display the second snapshot for the predetermined time interval before displaying the next snapshot of the data points and wedges for the first entity. During the predetermined time interval, the command map GUI engine 132 queries the server 110 for the command usage data for the first entity for a third time period from start timepoint t0 to end timepoint t2. The end timepoint t2 may be identified by again applying the predetermined time increment X to the previous end timepoint t1. Thus, for generating the third snaphot, the command map GUI engine 132 queries the server 110 for the command usage data for the first entity for a third time period from t0 to 2x. FIG. 13C is a screenshot of the command map GUI implemented in FIG. 1 displaying a third snapshot of the animation feature, according to various embodiments of the present invention. As shown, the command map GUI 700 generates and displays the third snapshot comprising a plurality of data points that visually illustrate the command usage of the first entity and a plurality of wedges that visually illustrate the command category usage of the first entity for the third time period between t0 and t3.

The command map GUI engine 132 may continue the above sequence of operations to automatically generate and display additional snapshots without receiving any further inputs from the user. Each snapshot in the series of snapshots may illustrate the command usage of the first entity for a different period of time, whereby the period of time increases by a predetermined amount of time (X) for each successive snapshot in the series of snapshots.

Techniques for Generating and Displaying the Command Map GUI

Figure 14:
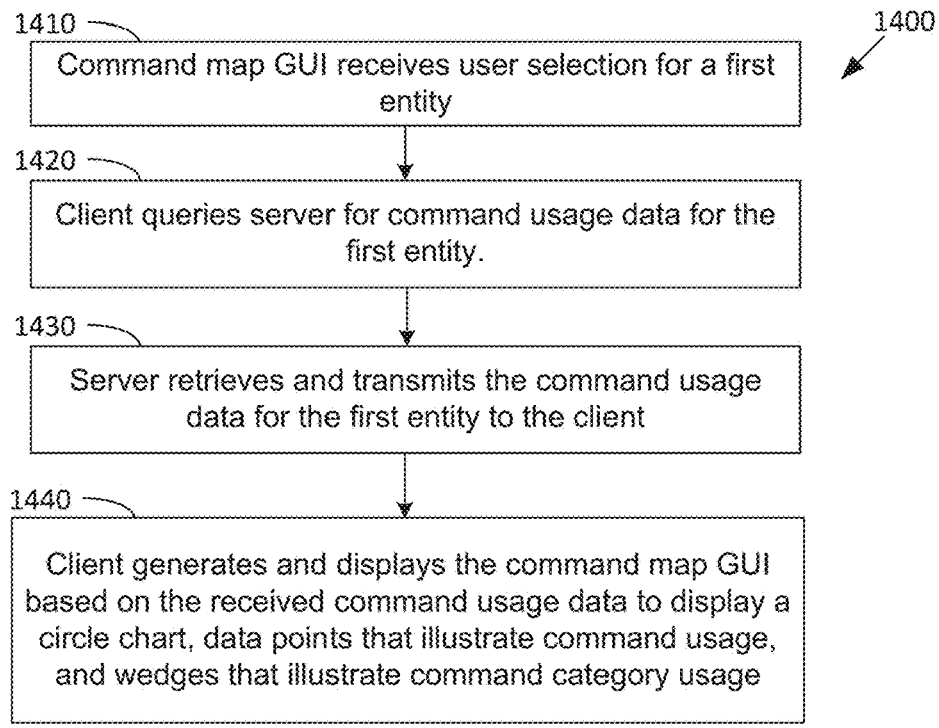
FIG. 14 is a flow diagram of method steps for generating a command map GUI that displays command usage data for a first entity, according to various embodiments of the present invention.

FIG. 14 is a flow diagram of method steps for generating a command map GUI that displays command usage data for a first entity, according to various embodiments of the present invention. Although the method steps are described in conjunction with the systems of FIGS. 1-4 and 7-13C, persons skilled in the art will understand that any system configured to perform the method steps, in any order, is within the scope of the invention. In some embodiments, the method 1400 may be performed by the command map GUI engine 132 executing on the client 130 in conjunction with the command data engine 112 executing on the server 110.

The method 1400 begins when the command map GUI 700 receives (at step 1410) a user selection to view the command usage data of a first entity (user or group). Optionally, the command map GUI may also receive a user selection of a specific time period for the desired command usage data for the first entity via the timepoint selectors 1210 and 1220. In response, the command map GUI engine 132 queries (at step 1420) the command data engine 112 for the command usage data for the first entity. As a default, the query does not specify a time period (start timepoint and end timepoint) for the command usage data and requests all command usage data that is available for the first entity. However, if the user selects a specific time period for the desired command usage data, the query includes the specified time period (start timepoint and end timepoint).

In response to the query, the command data engine 112 retrieves (at step 1430) the command usage data for the first entity and transmits the command usage data in a response to the command map GUI engine 132. If the first entity is a user, the command data engine 112 retrieves and transmits the command usage data 127 for the user from the database 125 to the command map GUI engine 132. If the first entity is a group, the command data engine 112 retrieves command usage data from a group table 116 corresponding to the group and transmits the command usage data to the command map GUI engine 132. For a group, the response from the server 110 may include compiled command usage data for the users in the group, such as an average amount of usage (number of invocations) for each command by the users in the group and an average amount of usage (number of invocations) for each command category across the users in the group.

The command map GUI engine 132 receives (at step 1440) the command usage data for the first entity and generates and displays the command map GUI based on the received command usage data and the command map table 114. In particular, the command map GUI 700 displays a circle chart 710 comprising a plurality of segments 720 representing a plurality of command categories, a center circle 730, and a plurality of circular bands concentric to the center circle 730. The command map GUI 700 also displays a plurality of data points on the circle chart 710 that visually illustrate the amount of usage for a plurality of commands by the first entity and a plurality of wedges on the circle chart 710 that visually illustrate the amount of usage for a plurality of command categories by the first entity. The method 1400 then ends.

Figure 15:
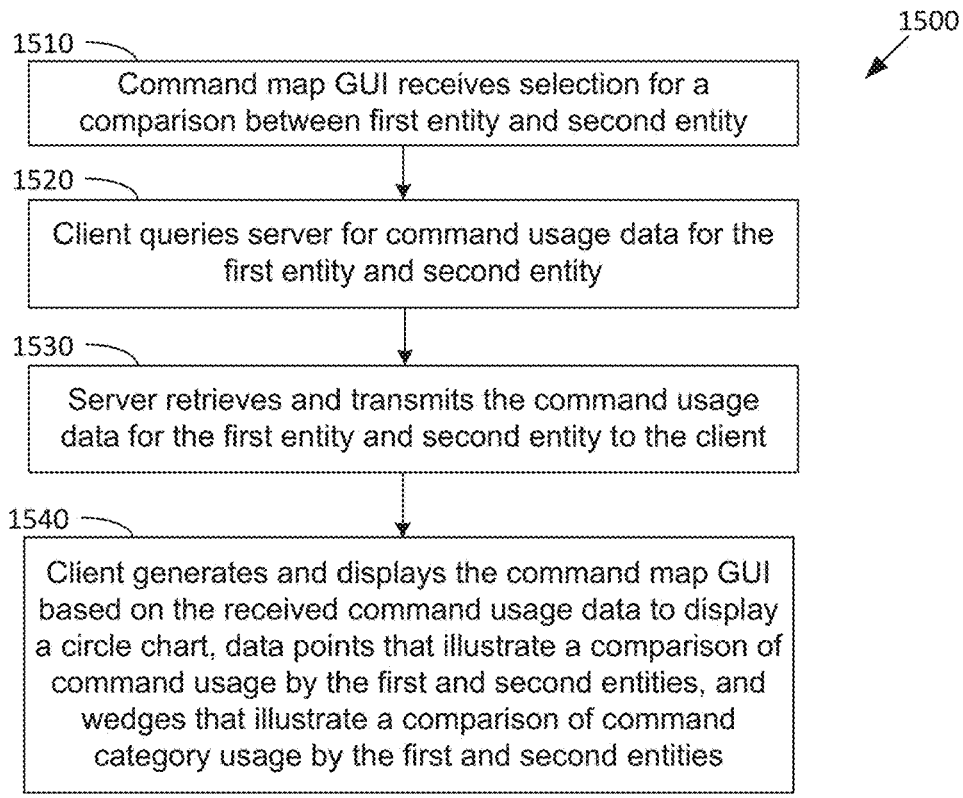
FIG. 15 is a flow diagram of method steps for generating a command map GUI that displays a comparison between command usage data for a first entity and a second entity, according to various embodiments of the present invention.

FIG. 15 is a flow diagram of method steps for generating a command map GUI that displays a comparison between command usage data for a first entity and a second entity, according to various embodiments of the present invention. Although the method steps are described in conjunction with the systems of FIGS. 1-4 and 7-13C, persons skilled in the art will understand that any system configured to perform the method steps, in any order, is within the scope of the invention. In some embodiments, the method 1500 may be performed by the command map GUI engine 132 executing on the client 130 in conjunction with the command data engine 112 executing on the server 110.

The method 1500 begins when the command map GUI receives (at step 1510) a user selection to view a comparison between the command usage data of a first entity (user or group) and a second entity (user or group) via the command map GUI. Optionally, the command map GUI may also receive a user selection of a specific time period for the desired command usage data for the first entity and the second entity via the timepoint selectors 1210 and 1220. In response, the command map GUI engine 132 queries (at step 1520) the command data engine 112 executing on the server 110 for command usage data for the first entity and the second entity. As a default, the query does not specify a time period (start timepoint and end timepoint) for the command usage data and requests all command usage data that is available for the first entity and the second entity. However, if the user selects a specific time period for the desired command usage data, the query includes the specified time period (start timepoint and end timepoint).

In response to the query, the command data engine 112 retrieves (at step 1530) the command usage data for the first entity and the second entity and transmits the command usage data to the command map GUI engine 132. If an entity is a user, the command data engine 112 retrieves and transmits command usage data 127 for the user from the database 125 to the command map GUI engine 132. If an entity is a group, the command data engine 112 retrieves command usage data from a group table 116 corresponding to the group and transmits the command usage data in a response to the command map GUI engine 132.

The command map GUI engine 132 receives (at step 1540) the command usage data for the first entity and the second entity and generates and displays the command map GUI based on the received command usage data and the command map table 114. In particular, the command map GUI displays a circle chart 710 comprising a plurality of segments 720 representing a plurality of command categories, a center circle 730, and a plurality of circular bands concentric to the center circle 730. The command map GUI also displays a plurality of data points on the circle chart 710 that visually illustrate the amount of usage for a plurality of commands by the first entity or the second entity. In these embodiments, either the data points for the first entity or the second entity are displayed, but the data points for both the first entity and the second entity are not displayed to avoid visual clutter on the circle chart 710. Each data point may be displayed with at least a first appearance or a second appearance. The first appearance may indicate that the amount of usage for the corresponding command by the first entity is greater than the amount of usage for the corresponding command by the second entity. The second appearance may indicate that the amount of usage for the corresponding command by the first entity is less than the amount of usage for the corresponding command by the second entity, wherein the second appearance is different than the first appearance in at least one visual characteristic. The command map GUI further displays a first set of wedges on the circle chart 710 that visually illustrate the amount of usage for a plurality of command categories by the first entity and a second set of wedges on the circle chart 710 that visually illustrate the amount of usage for the plurality of command categories by the second entity. The command map GUI may display the first set of wedges with a different appearance than the second set of wedges to allow the user to easily distinguish between the two sets of wedges. The method 1500 then ends.

Recommendation Materials

In some embodiments, when executing the command map GUI engine 132, the client 130 may also execute the recommendation engine 136 to generate and display embedded recommendations (such as recommended materials, recommended certifications, and recommended unused commands) within the command map GUI. In other embodiments, the recommendation engine 136 may also work in conjunction with any other type of GUI that implements command usage data of various users or groups.

Figure 16:
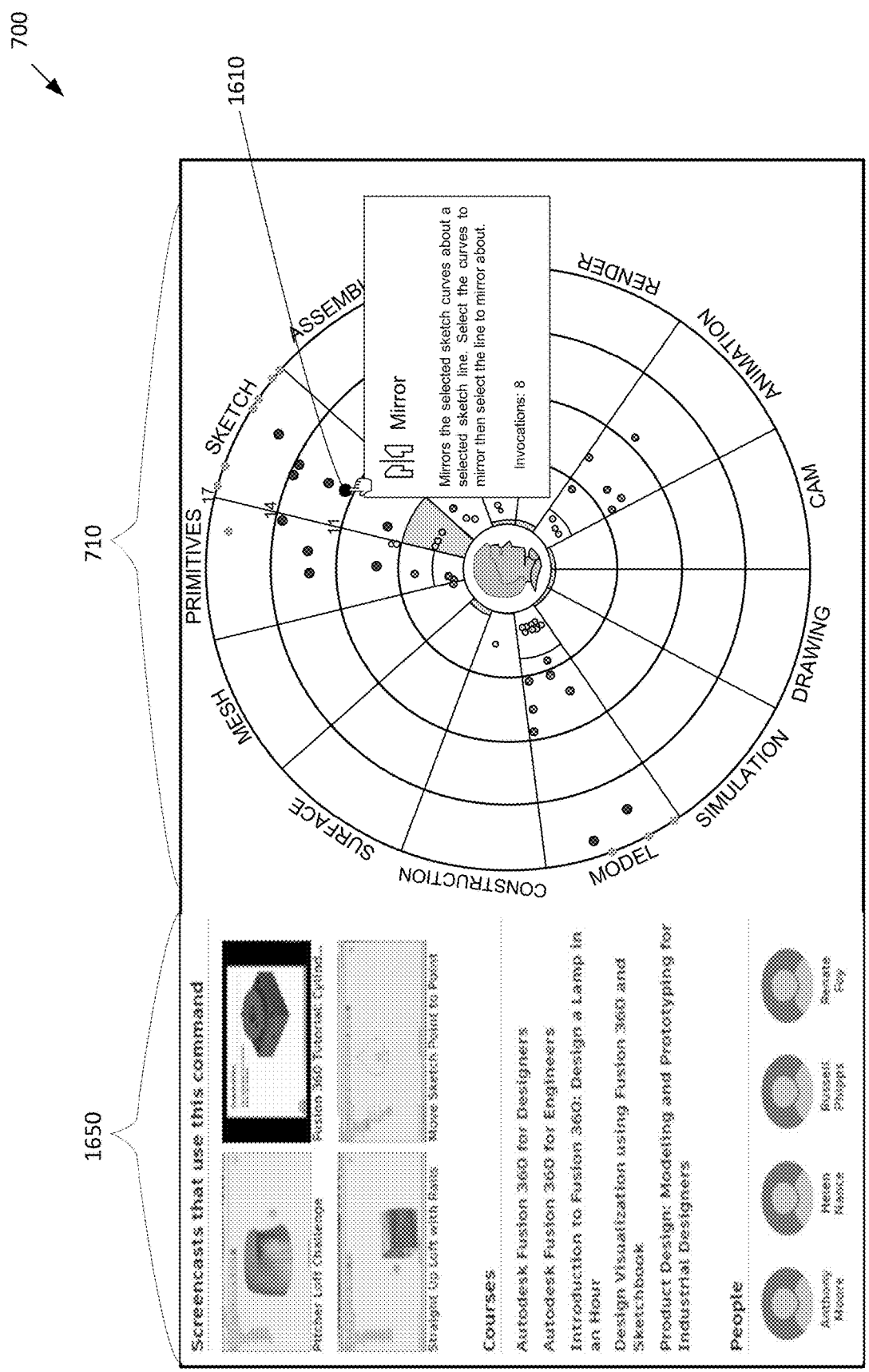
FIG. 16 is a screenshot of the command map GUI implemented in FIG. 1 for displaying recommended materials, according to various embodiments of the present invention.

During the runtime phase, the user may select, via the command map GUI, to view related materials for a particular command of the software application. The user may do so by selecting a data point representing the particular command as displayed in the circle chart 710. In response, the command map GUI may display a set of links to items/materials related to the particular command, such as articles, tutorials, and videos. FIG. 16 is a screenshot of the command map GUI implemented in FIG. 1 for displaying recommended materials, according to various embodiments of the present invention. As shown, the command map GUI 700 displays a plurality of data points that represent the plurality of commands of the software application, each data point representing a particular command included within a particular command category.

A user may place a cursor over a particular data point 1610 for a particular command, which causes the command map GUI 700 to display text adjacent to the selected data point 1610 that includes the name and/or a short description of the particular command. A user may also select the particular data point 1610 (e.g., click on the data point 1610) for a particular command which causes the command map GUI 700 to display of a set of connections/links 1650 to related items/materials for the particular command in a side panel of the GUI 700. For example, the command map GUI 700 may display of a set of connections/links 1650 to articles, tutorials, videos, screencasts, and user connections associated with/related to the particular command. User connections may include connections/links to other users who may have expertise with the particular command (based on command usage data of the other users).

Recommended Certifications

As the user becomes more advanced in using the commands of the software application, the user may wish to achieve certifications associated with the software application. In some embodiments, a certification comprises any type of accreditation/credential or qualification that provides an official recognition or documentation that the user has achieved a particular level of proficiency for a particular type of skill associated with the software application. Examples of such certifications include credentials for CAD sketching, parametric modeling, generative design, digital manufacturing, automation, and the like. In other embodiments, certifications for other types of credentials may be used. In these embodiments, a user may achieve a particular certification by taking and passing a test 119 for the certification. For example, a company or other enterprise may provide various certification tests 119 for their employees which may be taken by logging onto the server 110 via a client 130. Passing certification tests may be beneficial to the professional and career development of the user as these certifications signify the user's proficiency in certain areas of the software application.

During the data collection phase, as discussed above in relation to FIG. 4, the server 110 generates and updates a plurality of certification tables 118 for a plurality of certifications. Each certification table 118 stores information for a particular certification including a list of users (referred to as the "certified group") who have achieved/passed the corresponding certification test and command usage data for the list of users. The certification table 118 may also include a timepoint associated with each user that indicates the date the user passed the test 119 for the certification. The command usage data for the list of users may include command usage data for the list of users that compile the command usage data for each user up to the timepoint that the user passed the certification test. Each certification table 118 may include compiled command usage data comprising the average amount of usage (average invocation value) for each command by the users who passed the certification and the average amount of usage (average invocation value) for each command category across the users who passed the certification. Upon a new user passing the test 119 for a particular certification, the command data engine 112 executing on the server 110 updates the certification table 118 for the particular certification by adding the new user and the associated timepoint. The command data engine 112 may further update the certification table 118 by retrieving the command usage data for the new user up to and including the date the user passed the certification test, and update the compiled command usage data in the certification table 118 based on the new command usage data.

During the runtime phase, the recommendation engine 136 and the command map GUI engine 132 may operate in conjunction to determine and display one or more certifications associated with the software application that are recommended for a current user. In these embodiments, a particular certification may be recommended for the current user based on the command usage data of the current user and the compiled command usage data of other users who have passed the particular certification (as stored in the certification table 118 for the particular certification). The recommended certifications may be displayed in the command map GUI or any other type of GUI. Thus, the GUI may display recommended certifications for allowing a user to easily identify certifications that the user may be qualified to achieve.

Figure 17:
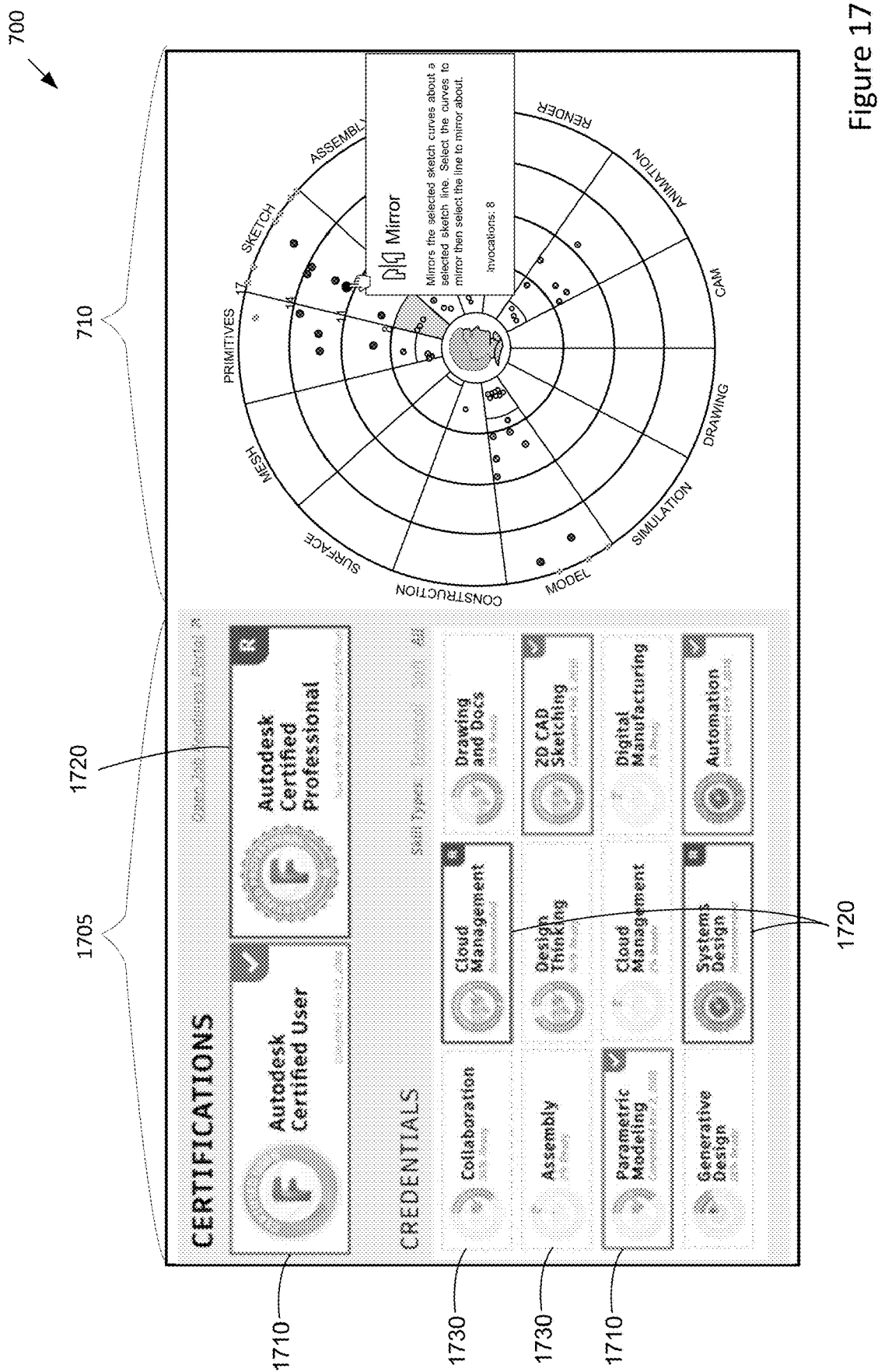
FIG. 17 is a screenshot of the command map GUI implemented in FIG. 1 for displaying recommended certifications, according to various embodiments of the present invention.

FIG. 17 is a screenshot of the command map GUI implemented in FIG. 1 for displaying recommended certifications, according to various embodiments of the present invention. As shown, the command map GUI 700 may comprise a side panel 1705 that displays a set of achieved certifications 1710, a set of recommended certifications 1720, and a set of non-recommended certifications 1730. For the set of achieved certifications 1710, the command map GUI 700 displays information for each certification that a current user has already achieved/passed, such as the name of the certification and the date the user achieved the certification. For the set of recommended certifications 1720, the command map GUI 700 may display information for each certification not yet achieved by the current user but recommended for the current user to achieve, such as the name/title of the certification. For the set of non-recommended certifications 1730, the command map GUI 700 may display information for each certification not yet achieved by the current user and not recommended for the current user, such as the name of the certification and a proportion value. For a particular non-recommended certification, the proportion value may indicate how close the current user is to being qualified for the particular certification.

In some embodiments, the GUI 700 may display the achieved certifications 1710, the recommended certifications 1720, and non-recommended certifications 1730 with different appearances to allow the current user to easily distinguish between the different types of certifications. For example, the achieved certifications 1710 may be displayed with green outlines and checkboxes, the recommended certifications 1720 may be displayed with blue outlines with a letter "R", and the non-recommended certifications 1730 may be displayed with a dimmed appearance. In other embodiments, the achieved certifications 1710, the recommended certifications 1720, and the non-recommended certifications 1730 may be displayed with any other types of appearances to allow the current user to easily distinguish between the different types of certifications.

Figure 18:
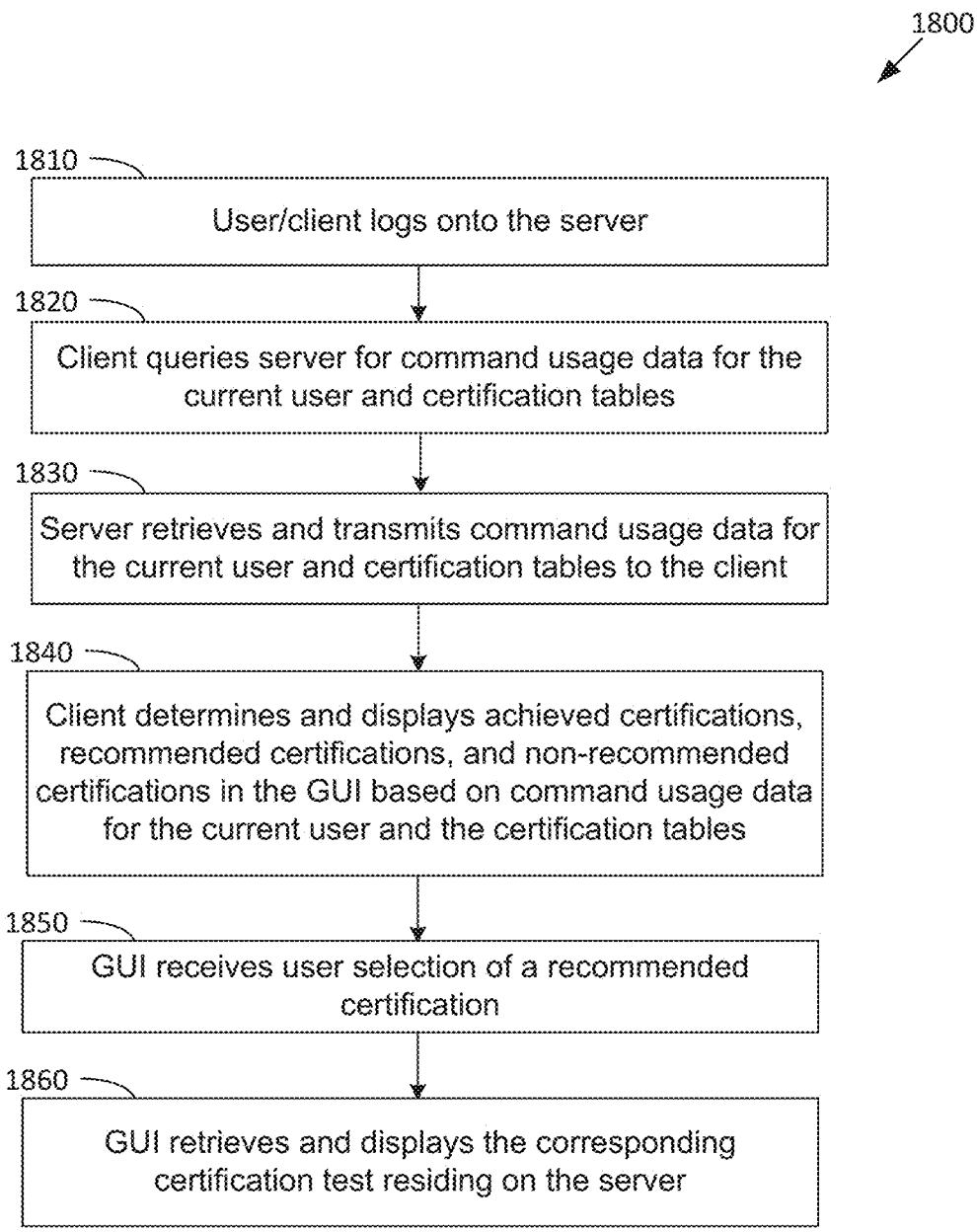
FIG. 18 is a flow diagram of method steps for determining one or more recommended certifications for a user of a software application, according to various embodiments of the present invention.

FIG. 18 is a flow diagram of method steps for determining one or more recommended certifications for a user of a software application, according to various embodiments of the present invention. Although the method steps are described in conjunction with the systems of FIGS. 1-4, 7-13C, and 16-17, persons skilled in the art will understand that any system configured to perform the method steps, in any order, is within the scope of the invention. In some embodiments, the method 1800 may be performed by the recommendation engine 136 and the command map GUI engine 132 executing on the client 130 in conjunction with the command data engine 112 executing on the server 110. In other embodiments, the method 1800 may be implemented by any other type of GUI engine that queries for and receives command usage data of various users and/or groups.

The method 1800 begins when a user/client 130 executes (at step 1810) the recommendation engine 136 and the command map GUI engine 132 and logs onto the server 110 (e.g., using a user ID and password). In response, the recommendation engine 136 queries (at step 1820) the command data engine 112 for command usage data for the current user and one or more certified groups for one or more certifications. In response to the query, the command data engine 112 retrieves and transmits (at step 1830) the command usage data for the current user and the command usage data for the one or more certified groups (stored in one or more corresponding certification tables 118) to the recommendation engine 136. The command usage data retrieved for each certified group (via the certification table 118) may include compiled command usage data for a certified group that has passed the corresponding certification. The compiled command usage data indicates the command usage patterns of the certified group. The compiled command usage data may include an average amount of usage (average invocation value) for each command by the users in the certified group and an average amount of usage (average invocation value) for each command category across the users in the certified group.

The recommendation engine 136 receives (at step 1840) the command usage data for the current user and the certified groups (via the certification tables 118) and determines and displays a set of achieved certifications 1710, a set of recommended certifications 1720, and a set of non-recommended certifications 1730 in the command map GUI based on the command usage data for the current user and the certified groups. For example, the recommendation engine 136 may determine the set of achieved certifications 1710 by examining each certification table 118 to determine if the user ID of the current user is listed in the certification table 118. If so, the current user is determined to have achieved the corresponding certification and the GUI (such as the command map GUI) may display information including the name/title of the achieved certification and the date the current user passed the achieved certification.

For each certification, the recommendation engine 136 may further determine the command usage patterns of the current user and the corresponding certified group based on the command usage data for the current user and the certified group. The recommendation engine 136 may then compare the command usage patterns of the current user with the command usage patterns of the corresponding certified group to determine the set of recommended certifications 1720 and the set of non-recommended certifications 1730.

For example, the recommendation engine 136 may determine the set of recommended certifications 1720 by processing the command usage data for the current user to determine the command usage patterns of the current user, including the amount of usage (invocation value) for each command by the current user and an average amount of usage (average invocation value) for each command category by the current user. The recommendation engine 136 may also examine the certification table 118 for each certification that the current user has not yet achieved to compare the command usage patterns of the current user to the command usage patterns of the certified group (as indicated by the certification table 118) to determine if the certification is recommended for the current user. If a certification is recommended, the GUI may display information such as the name/title of the recommended certification. The recommendation engine 136 may compare the command usage patterns of the current user and the certified group using any variety of techniques to determine if the certification is recommended for the current user. In general, the recommendation engine 136 may compare the command usage of the current user and the certified group and/or compare the command category usage of the current user and the certified group to determine if the certification is recommended for the current user.

For example, the recommendation engine 136 may compare the invocation value for each command by the current user to the average invocation value for each command by the certified group. If the invocation value for the current user is equal to or greater than the average invocation value for the certified group for each command of the software application, the recommendation engine 136 may determine that the certification is recommended for the current user. In other embodiments, if the invocation value for the current user is equal to or greater than the average invocation value for the certified group for at least a predetermined threshold number of commands of the software application, the recommendation engine 136 may determine that the certification is recommended for the current user. In other embodiments, if the average invocation value for the current user is equal to or greater than the average invocation value for the certified group for each command category of the software application, the recommendation engine 136 may determine that the certification is recommended for the current user. In other embodiments, if the average invocation value for the current user is equal to or greater than the average invocation value for the certified group for at least a predetermined threshold number of command categories of the software application, the recommendation engine 136 may determine that the certification is recommended for the current user. In further embodiments, any combination of the above techniques may be used, including applying different weights to the different techniques, to determine if a certification is recommended for the current user. For example, a certification may be recommended for the current user if the invocation value for the current user is equal to or greater than the average invocation value for the certified group for each command and the average invocation value for the current user is equal to or greater than the average invocation value for the certified group for each command category.

The set of non-recommended certifications 1730 includes the certifications that the current user has not achieved and are not recommended for the current user. The GUI may display the name/title of the each non-recommended certification and a proportion value adjacent to the name/title. For each non-recommended certification, the recommendation engine 136 determines a proportion value (such as a percentage value) indicating how close the current user is to being qualified for the particular certification and having the particular certification being recommended for the current user by the recommendation engine 136. The recommendation engine 136 may determine the proportion value for a non-recommended certification by comparing the command usage patterns of the current user and the certified group using any variety of techniques. In general, the recommendation engine 136 may compare the command usage of the current user and the certified group and/or compare the command category usage of the current user and the certified group to determine the proportion value for the non-recommended certification. In some embodiments, the proportion value comprises/represents a numerical quantification of the result of the comparison between the command usage patterns of the current user and the command usage patterns of the certified group.

For example, the recommendation engine 136 may compare the invocation value for each command by the current user to the average invocation value for each command by the users of the certified group. The proportion value may indicate the proportion/percentage of all commands where the invocation value for the current user is equal to or greater than the average invocation value for the certified group. For example, if there are 100 total commands of the software application, and the invocation value for the current user is equal to or greater than the average invocation value for the certified group for 60 commands, the proportion value is set to equal 60%. In other embodiments, the proportion value may indicate the proportion/percentage of all command categories where the average invocation value for the current user is equal to or greater than the average invocation value for the certified group. For example, if there are 8 total command categories of the software application, and the average invocation value for the current user is equal to or greater than the average invocation value for the certified group for 4 command categories, the proportion value is set to equal to 50%. In further embodiments, any combination of the above techniques may be used, including applying different weights to the different techniques, to determine the proportion value for a non-recommended certification. For example, the recommendation engine 136 may calculate an average of the above proportion values to determine a final proportion value (equal to 55%) for the non-recommended certification. In further embodiments, the recommendation engine 136 may determine the proportion value by considering how close the average command category usage by the user is to the average of the certified users. For example, if the user is almost at the average usage for certified users for a given category, the determined proportion value will be higher than for a user who has no usage nothing in the category.

The GUI then receives (at step 1850) a user selection of a recommended certification in the set of recommended certifications 1720. In response, the recommendation engine 136 retrieves (at step 1860) the corresponding certification test 119 that resides on the server 110 via the network 120 and the GUI displays the retrieved certification test 119. The method 1800 then ends.

The method 1800 may be initiated at predetermined time intervals, such as once a week, to determine the set of recommended certifications for the current user. In other embodiments, the method 1800 may be initiated in another manner, such as whenever the command map GUI engine is executed and the command map GUI is displayed.

Recommended Unused Commands

To further advance the user's proficiency in the software application, it is also beneficial to identify unused commands that the user should perform/invoke to further develop the user's skills in the software application. In further embodiments, the recommendation engine 136 and the command map GUI engine may also work in conjunction to determine and display one or more commands that are yet unused by the current user but are recommended for the current user. In these embodiments, unused commands are recommended based on the command usage patterns of the current user and command usage patterns of one or more groups of users that are similar to the current user. A group of users that is similar to the current user may comprise a group that includes the current user. A group may be defined by a group table 116 and based on a relationship between the users (e.g., department, job title, industry field, project, team, etc.), as discussed above in relation to FIG. 3. If the current user is listed in the group table 116 for a group, the other users in the group may comprise the users who are similar to the current user.

In other embodiments, a group of users that is similar to the current user may comprise a group that is determined using a collaborative filtering algorithm that is executed by the command data engine 112 on the command usage data 127 stored to the database 125. The collaborative filtering algorithm may comprise any type of collaborative or community-based algorithm, or any standard user-based or item-based collaborative filtering algorithm. In these embodiments, the collaborative filtering algorithm may identify one or more groups based on command usage patterns, each group comprising a plurality of users having similar command usage patterns. For each group identified by the collaborative filtering algorithm, the command data engine 112 may generate, manage, and update a group table 116 for the identified group. As discussed above in relation to FIG. 3, the group table 116 may comprise a list of users included in the group (e.g., a list of user IDs) and compiled command usage data for the users in the group, such as average amount of usage (average invocation value) for each command by the users in the group and an average amount of usage (average invocation value) for each command category across the users in the group. In some embodiments, the group tables 116 is dynamically generated based on similarities in command usage patterns as determined by the collaborative filtering algorithm.

During the runtime phase, the recommendation engine 136 and the command map GUI engine 132 may determine and display data points for unused commands recommended for the current user on a circle chart based on the command usage data of the current user, the compiled command usage data of one or more groups (similar users) that include the current user, and the command map table 114. The distance of each data point from the center of the circle chart may visually represent/illustrate the strength of the recommendation (as defined by a recommendation value) for the corresponding command for the current user. The recommended commands may be displayed in the command map GUI or other type of GUI. Thus, the GUI may display recommended commands for allowing a user to easily identify unused commands that the user should invoke to advance the user's overall proficiency in the software application.

Figure 19:
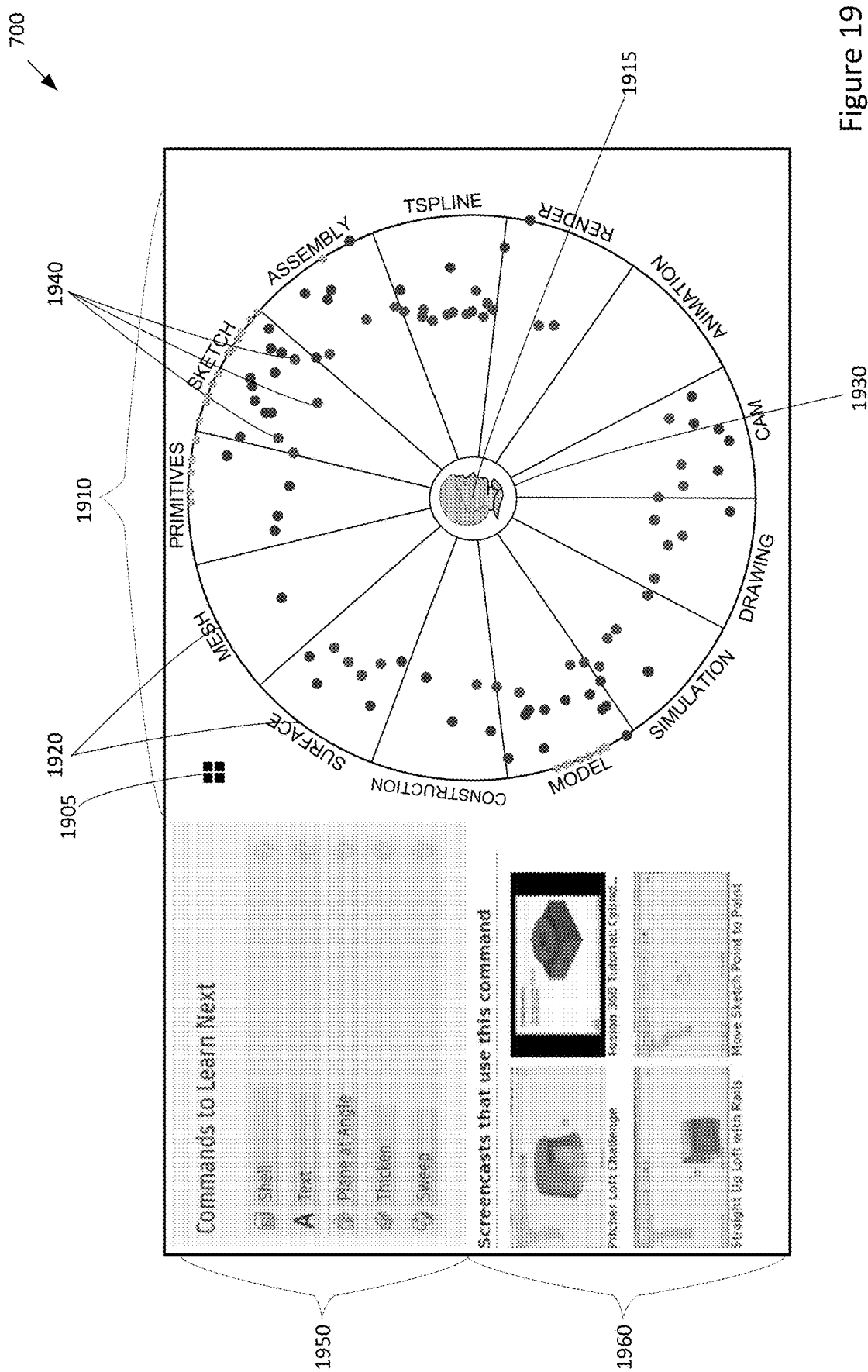
FIG. 19 is a screenshot of the command map GUI implemented in FIG. 1 for displaying recommended commands, according to various embodiments of the present invention.

FIG. 19 is a screenshot of the command map GUI implemented in FIG. 1 for displaying recommended commands, according to various embodiments of the present invention. As shown, the command map GUI 700 may display a selector box 1905, a circle chart 1910, a list of recommended commands 1950, and a set of connections/links 1960 to related materials. The selector box 1905 may be selected by the user to initiate the recommended commands feature of the GUI. The list of recommended commands 1950 may display information for a set of unused commands having the highest recommendation values for the current user. As discussed above in relation to FIG. 16, the set of connections/links 1960 to materials related to a particular command may be displayed when a user selects a particular data point for the particular command. The set of connections/links 1960 may include links to materials such as articles, tutorials, videos, screencasts, user connections, and the like.

The circle chart 1910 may be generated and displayed using the command map table 114 using some or all operations used for generating and displaying the circle chart 710 described in relation to FIG. 7. For example, the circle chart 1910 may comprise a plurality of segments 1920, each segment 1920 corresponding to a particular command category of the software application. Each segment 1920 has an associated range of degrees that defines the position/orientation of the segment 1920 within the circle chart 1910. The command map GUI 700 may display the name of the command category adjacent to the segment 1920 corresponding to the command category. The circle chart 1910 may further include a center point 1915 and an inner center circle 1930 having a predetermined radius. As used herein, a distance may be measured in a number of pixels and a "distance from center" may refer to a distance from the perimeter of the center circle 1930 to a given point on the circle chart 1910, as measured by a line connecting the center point 1915 of the circle chart 1910 to the given point.

As shown in FIG. 19, the command map GUI 700 further displays a plurality of data points 1940 on the circle chart 1910 that graphically represent a plurality of unused commands by the current user, each data point representing a particular command included within a particular command category. A data point that represents an unused command may be displayed within the segment that represents the command category that includes the command, and displayed at a degree predetermined for the particular command (as specified in the command map table 114). The distance from center of a data point representing an unused command indicates the recommendation strength (recommendation value) for the unused command for the current user. Each distance value from the center of the circle chart 1910 corresponds to and represents a distinct recommendation value for a command. In general, greater distances from the center circle 1930 represent higher recommendation values, so that as the distance from center increases, the value of the corresponding recommendation value also increases. In other embodiments, however, greater distances from the center circle 1930 may represent lower recommendation values, so that as the distance from center increases, the value of the corresponding recommendation number decreases.

The circle chart 1910 may represent a predetermined normalized range of recommendation values (such as 0-99). Within the circle chart 1910, the relationship between the distance from the center circle 1930 and the corresponding recommendation value that the distance represents comprises a linear relationship. In these embodiments, as the distance from center increases, the invocation value increases in a linear manner. The linear relationship between the distance from the center circle 1930 and the corresponding recommendation value within the circle chart 1910 may be defined by a pixel/value ratio that specifies a number of pixels associated with a single increment of the recommendation value. The pixel/value ratio may be determined by dividing the width of the circle chart 1910 (in pixels) by the total number of different recommendation values represented by the circle chart 1910. For example, if the circle chart 1910 has a width of 1000 pixels and represents a range of recommendation values 0 to 99 (comprising 100 different recommendation values), the pixel/value ratio equals 10 (1000/100). This ratio indicates that each single increment of the recommendation value corresponds to an increase in the distance from center of 10 pixels. The pixel/value ratio may be used by the command map GUI engine 132 to determine a distance from the center circle for various recommendation values when displaying the data points representing recommended unused commands in the circle chart 1910.

Figure 20:
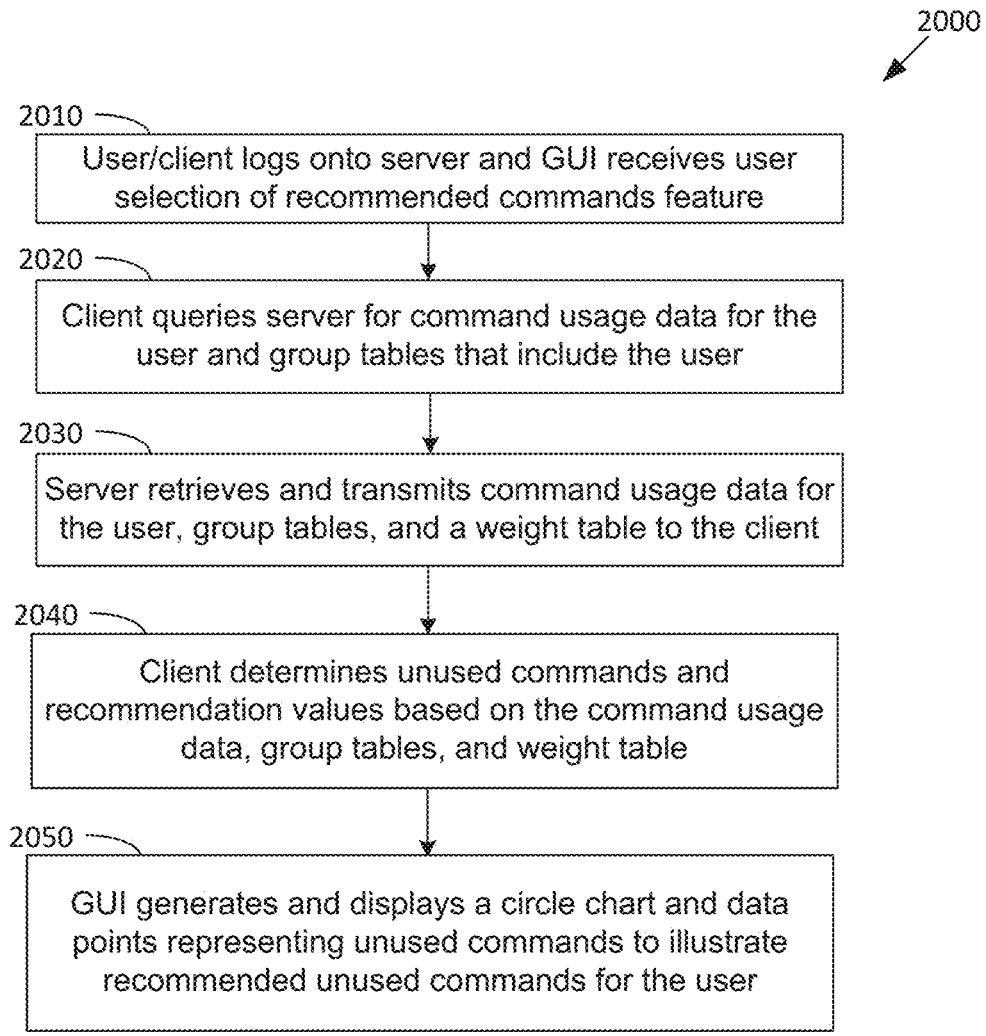
FIG. 20 is a flow diagram of method steps for determining one or more recommended commands for a user of a software application, according to various embodiments of the present invention.

FIG. 20 is a flow diagram of method steps for determining one or more recommended commands for a user of a software application, according to various embodiments of the present invention. Although the method steps are described in conjunction with the systems of FIGS. 1-4, 7-13C, 16-17, and 19 persons skilled in the art will understand that any system configured to perform the method steps, in any order, is within the scope of the invention. In some embodiments, the method 2000 may be performed by the recommendation engine 136 and the command map GUI engine 132 executing on the client 130 in conjunction with the command data engine 112 executing on the server 110. In other embodiments, the method 2000 may be implemented by any other type of GUI engine that queries for and receives command usage data of various users and/or groups.

The method 2000 begins when the user/client 130 logs onto (at step 2010) the server 110 (e.g., using a user ID and password) and the command map GUI receives a user selection of the recommended commands feature (via the selector box 1905). In response, the recommendation engine 136 queries (at step 2020) the command data engine 112 for command usage data for the current user and one or more group tables 116 for one or more groups that include the current user. In response to the query, the command data engine 112 retrieves and transmits (at step 2030) the command usage data for the current user and one or more group tables 116 to the recommendation engine 136. Each group table 116 may include compiled command usage data for a group that includes the current user, which indicates the command usage patterns of the group. The compiled command usage data may include an average amount of usage (average invocation value) for each command by the users in the group and an average amount of usage (average invocation value) for each command category across the users in the group. In some embodiments, the command data engine 112 also receives and transmits (at step 2030) a weight table specifying a plurality of different weights for a plurality of commands, each weight to be applied to a particular command. The weights for the commands may be predetermined based on various factors. For example, commands that are considered more advanced or sophisticated may be assigned higher weights than commands that are considered less advanced or sophisticated. For example, commands that a company or enterprise wishes to be used more frequently may also be assigned higher weights.

The recommendation engine 136 receives (at step 2040) the command usage data for the current user, the one or more group tables 116, and the weight table and determines a set of unused commands and a recommendation value for each unused command based on the command usage data for the current user, the one or more group tables 116, and the weight table. For example, the recommendation engine 136 may first determine a set of unused commands by examining the command usage data for the current user and determining all commands that are yet unused by the current user (e.g., by examining the command IDs in the command usage data for the current user). For each unused command, the recommendation engine 136 may then determine a recommendation value indicating the strength of the recommendation for the current user to try/invoke the corresponding command.

The recommendation value for a particular unused command may be determined using any variety of techniques. For example, the recommendation value for a particular unused command may be based on the average invocation value for the unused command by a group that includes the current user, as specified in the group table 116 for the group. In general, higher average invocation values for an unused command by the group may produce a higher recommendation value for the unused command. If two or more groups include the current user, the recommendation value may be based on the average of the average invocation values for the command across the two or more groups. A weight may also be applied to the recommendation value based on the unused command, as specified by the weight table received from the server 110, to produce a final recommendation value for the unused command. Each recommendation value may also be normalized to a predetermined range (such as 0 to 99).

The command map GUI engine 132 then displays (at step 2050) a circle chart 1910 and a plurality of data points 1940 representing the unused commands based on the determined recommendation values and the command map table 114, as illustrated in FIG. 19. For example, the command map GUI engine 132 determines a distance from the center of the circle chart 1910 for each data point based on the corresponding recommendation value and the pixel/value ratio for the circle chart 1910. Each data point 1940 is then displayed at the determined distance from the center of the circle chart 1910, which graphically illustrates the strength of the recommendation (recommendation value) for the corresponding command. The command map GUI may also display (at step 2050) the list of top recommended commands 1950 based on the set of recommendation values. The method 2000 then ends.

Server and Client Machines

Figure 21:
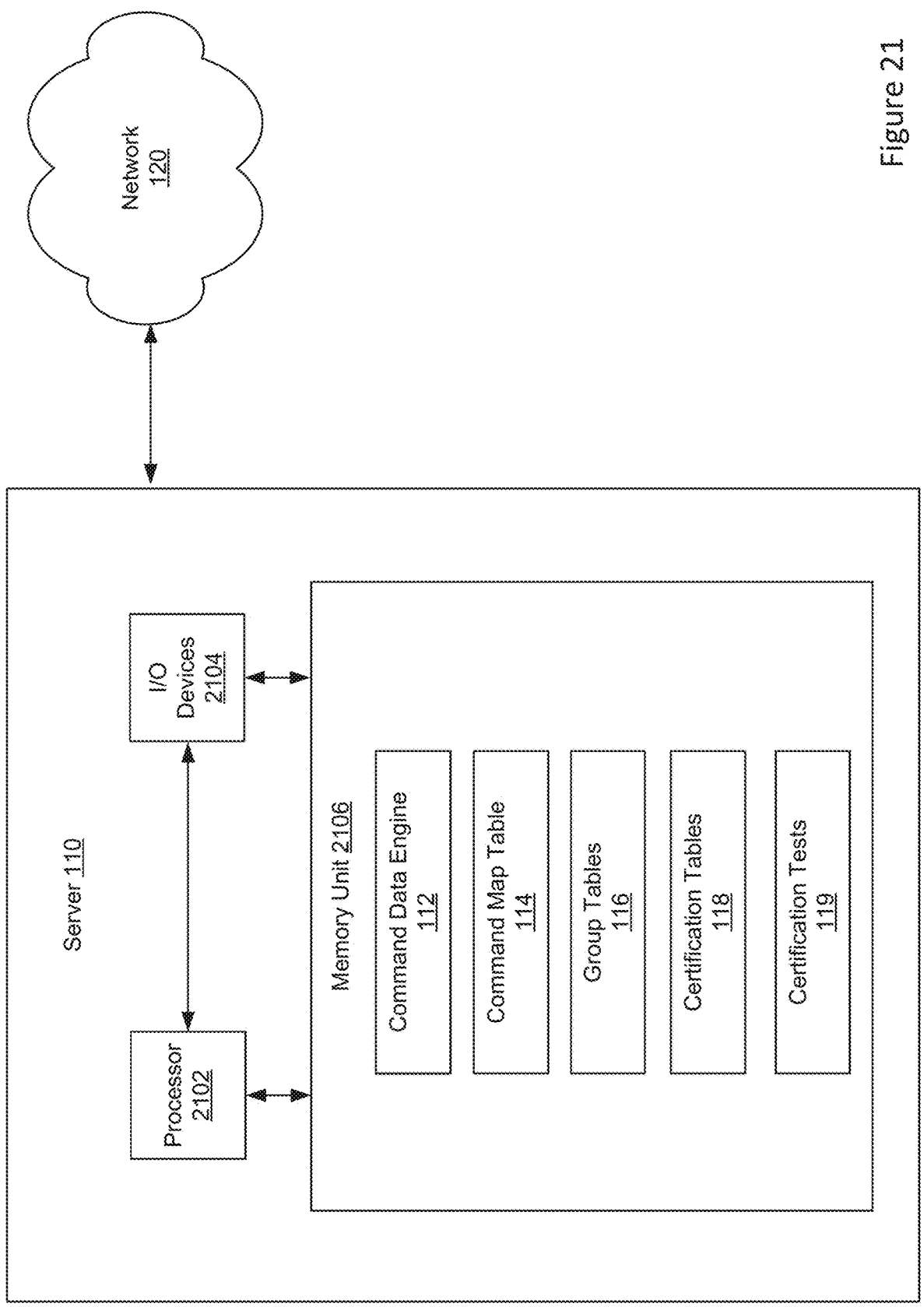
FIG. 21 illustrates an exemplary server device that can be implemented in the command map system of FIG. 1, according to various embodiments of the present invention.

FIG. 21 illustrates an exemplary server device that can be implemented in the command map system of FIG. 1, according to various embodiments of the present invention. The server 110 may comprise a computing device or machine, such as a server system, desktop computer, laptop computer, or any other type of computing device suitable for practicing various embodiments of the present invention. The server 110 comprises at least one processor 2102, input/output (I/O) devices 2104, and a memory unit 2106, coupled together. The server 110 is coupled to a network 120 via a network interface (not shown). The network 120 may comprise any technically feasible communications or information network, wired or wireless, that allows data exchange, such as a wireless (Wi-Fi) network, personal area network (such as Bluetooth, Wireless USB, IrDA, etc.), wide area network (WAN), a local area network (LAN), and/or the Internet, among others.

In general, a processor 2102 may be any technically feasible processing device or hardware unit capable of processing data and executing software applications and program code. The processor 2102 executes the software and performs the functions and operations set forth in the embodiments described herein. For example, a processor 2102 may comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, or any combination of different processing units, such as a CPU configured to operate in conjunction with a GPU.

The memory unit 2106 may include a hard disk, a random access memory (RAM) module, a flash memory unit, or any other type of memory unit or combination thereof. Processor and I/O devices read data from and write data to memory 2106. The memory unit 2106 is configured to store software application(s) and data. Instructions from the software constructs within the memory unit 2106 are executed by processors to enable the operations and functions described herein. In various embodiments, the memory unit 2106 is configured to store a command data engine 112, command map table 114, at least one group table 116, at least one certification table 118, and at least one certification test 119 for performing embodiments herein. The server 110 may be connected to a database 125 (not shown) that stores command usage data 127 received from the clients 130. The processor 2102 is configured to execute the command data engine 2102 to provide an underlying functionality of a command map system as described in various embodiments herein.

I/O devices 2104 are also coupled to memory 2106 and may include devices capable of receiving input, such as a keyboard, a mouse, a trackball, and so forth, as well as devices capable of providing output, such as a display, speaker, and so forth. Additionally, I/O devices may include devices capable of both receiving input and providing output, such as a touchscreen, a universal serial bus (USB) port, and so forth.

Figure 22:
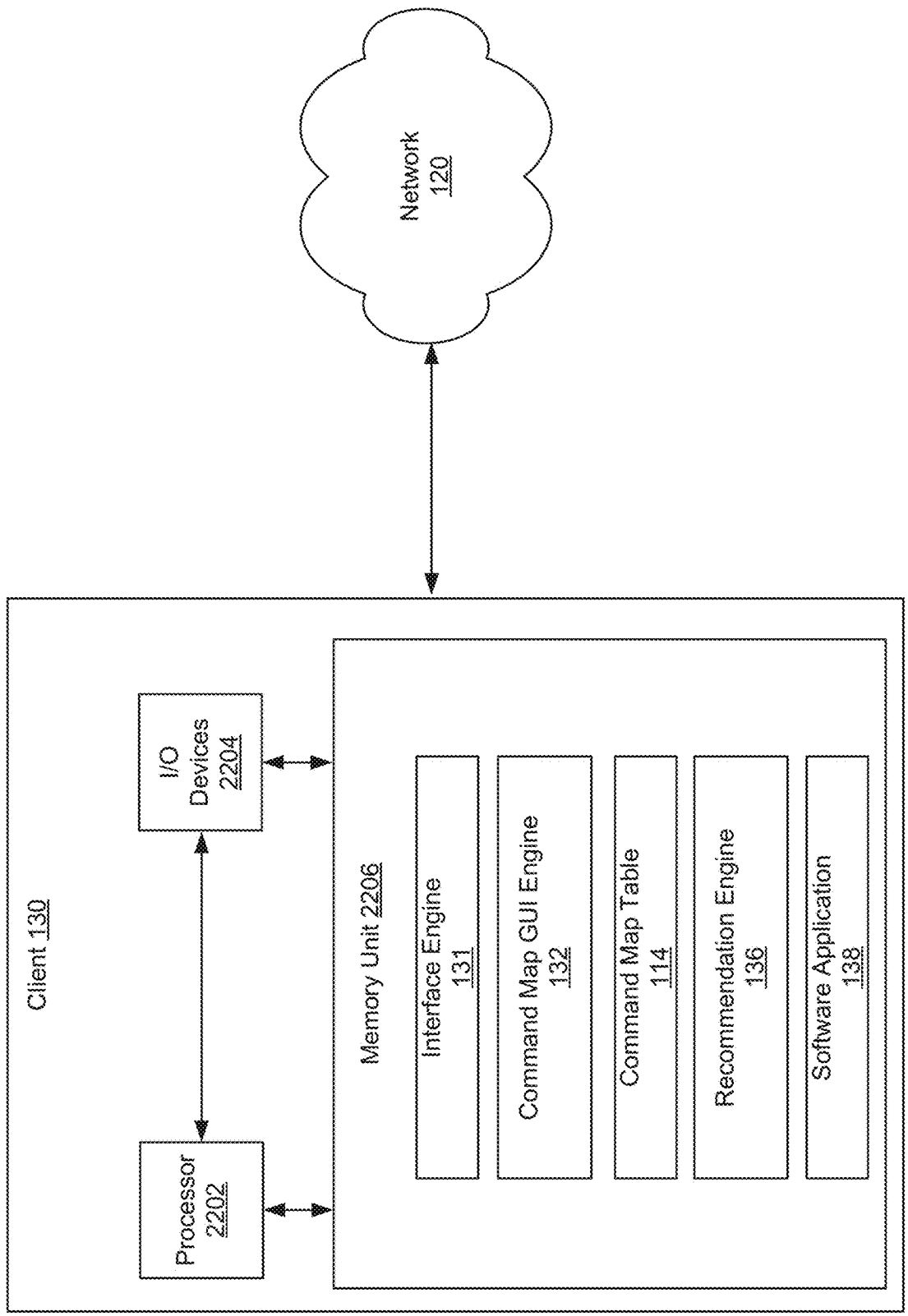
FIG. 22 illustrates an exemplary client device that can be implemented in the command map system of FIG. 1, according to various embodiments of the present invention.

FIG. 22 illustrates an exemplary client device that can be implemented in the command map system of FIG. 1, according to various embodiments of the present invention. The client 130 may comprise a computing device or machine, such as a desktop computer, laptop computer, mobile device, or any other type of computing device suitable for practicing various embodiments of the present invention.

The client 130 comprises at least one processor 2202, input/output (I/O) devices 2204, and a memory unit 2206, coupled together. The client 130 is coupled to a network 120 via a network interface (not shown). In general, a processor 2202 may be any technically feasible processing device or hardware unit capable of processing data and executing software applications and program code. The processor 2202 executes the software and performs the functions and operations set forth in the embodiments described herein. For example, a processor 2202 may comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, or any combination of different processing units, such as a CPU configured to operate in conjunction with a GPU.

The memory unit 2206 may include a hard disk, a random access memory (RAM) module, a flash memory unit, or any other type of memory unit or combination thereof. Processor and I/O devices read data from and write data to memory 2206. The memory unit 2206 is configured to store software application(s) and data. Instructions from the software constructs within the memory unit 2206 are executed by processors to enable the operations and functions described herein. In various embodiments, the memory unit 2206 is configured to store an interface engine 131, a command map GUI engine 132, a recommendation engine 136, a software application 138, and a command map table 114 for performing embodiments herein. The processor 2202 is configured to execute the interface engine 131, command map GUI engine 132, and the recommendation engine 136 to provide an underlying functionality of a command map system as described in various embodiments herein.

I/O devices 2204 are also coupled to memory 2206 and may include devices capable of receiving input, such as a keyboard, a mouse, a trackball, and so forth, as well as devices capable of providing output, such as a monitor/display, speaker, and so forth. Additionally, I/O devices may include devices capable of both receiving input and providing output, such as a touchscreen, a universal serial bus (USB) port, and so forth. In particular, the I/O devices may further include a display monitor that displays the command map GUI or any other type of GUI.

In sum, embodiments described herein are directed towards a GUI system that generates and displays a command map GUI. The command map GUI visually illustrates command usage patterns of a first entity (a user or group) for a software application. The command map GUI may also visually illustrate a comparison between the command usage patterns of a first entity (a user or group) and the command usage patterns of a second entity (a user or group) for a software application. The software application may comprise any type of computer-based software application or suite, such as a design application or any other type of software application. During a data collection phase, a central server receives and stores command usage data from a plurality of clients, each client executing a software application while a user invokes particular commands of the software application.

During a runtime phase, a client executes a command map GUI engine and stores a command map table comprising a plurality of parameters for generating the command map GUI. Via the command map GUI, a current user selects to view the command usage data of a first entity. In response, the client receives the command usage data for the first entity from the server and generates and displays the command map GUI based on the received command usage data and the command map table. The command map GUI displays a circle chart comprising a plurality of segments, each segment representing a command category of the software application. The command map GUI displays a first wedge inside each segment, the size of the first wedge visually representing the amount of usage of the corresponding command category for the first entity. The command map GUI may further display a plurality of data points, each data point representing a particular command. The distance of each data point from the center of the circle chart visually represents the amount of usage of the corresponding command by the first entity.

During the runtime phase, the user may also select to view the command usage data of a second entity in comparison to the first entity. In response, the client receives from the server the command usage data for the first entity and the second entity and generates and displays the command map GUI based on the received command usage data and the command map table. In some embodiments, for the second entity, the command map GUI displays a second wedge inside each segment for representing the command usage of the corresponding command category by the second entity. The command map GUI may also display a plurality of data points, each data point representing the amount of usage of a particular command for the first entity or the second entity. A data point is displayed with a particular appearance to indicate whether the first entity is using the corresponding command more than or less than the second entity.

At least one advantage of the disclosed techniques is that a computer device is enabled to generate and display a command map graphical user interface (GUI) that visually indicates an amount of usage (number of invocations) for various commands and command categories for a particular user or group of users. Thus, the disclosed technique provides a technological improvement and technological advancement over prior approaches as the disclosed technique generates and displays the user interface for allowing a user to easily evaluate and comprehend his/her command usage patterns and/or compare his/her command usage patterns to other users and/or groups. The disclosed technique allows user interactions with the computer device to be more efficient and effective in generating and displaying visualizations of the command usage patterns relative to prior approaches. Thus, the functions and operations of the computer device itself are implemented in a more efficient and effective manner than in prior approaches.

In further embodiments, the command map GUI may also determine and display one or more certifications associated with the software application that are recommended for a user. In these embodiments, certifications are recommended for a user based on the command usage patterns of the user and the command usage patterns of other users who have successfully passed the certifications. The recommended certifications may be displayed in the command map GUI or other type of GUI. Another advantage of the disclosed techniques is that a computer device is enabled to determine and display recommended certifications associated with the software application for a user. Thus, the disclosed technique provides a technological improvement and technological advancement over prior approaches as the disclosed technique determines and displays recommended certifications for allowing a user to easily identify certifications that the user is qualified to pass. The disclosed technique allows user interactions with the computer device to be more efficient and effective in determining and displaying recommended certifications for the user relative to prior approaches. Thus, the functions and operations of the computer device itself are implemented in a more efficient and effective manner than in prior approaches.

In further embodiments, the command map GUI may also determine and display one or more unused commands that are recommended for a current user. In these embodiments, unused commands are recommended based on the command usage patterns of the current user and command usage patterns of users that are determined to be similar to the current user. The recommended commands may be represented as data points that are displayed on a circle chart. The distance of each data point from the center of the circle chart may graphically/visually represent the strength of the recommendation for the corresponding command for the current user. The recommended commands may be displayed in the command map GUI or other type of GUI. A further advantage of the disclosed techniques is that a computer device is enabled to determine and display recommended commands that are presently unused by a current user. Thus, the disclosed technique provides a technological improvement and technological advancement over prior approaches as the disclosed technique determines and displays recommended commands for allowing a user to easily identify unused commands that the user should invoke to advance the user's overall proficiency in the software application.

The disclosed technique allows user interactions with the computer device to be more efficient and effective in determining and displaying recommended commands for the user relative to prior approaches. Thus, the functions and operations of the computer device itself are implemented in a more efficient and effective manner than in prior approaches.

Aspects of the subject matter described herein are set out in the following numbered any of clauses.

1. In some embodiments, a computer-implemented method comprising: receiving command usage data indicating how much a user and a first user group has used a set of commands of a software application, wherein the user has not achieved a first certification and the first user group comprises a plurality of certified users who have achieved the first certification; comparing one or more command usage patterns of the user and the plurality of certified users of the first user group based on the command usage data; and displaying, within a graphical user interface (GUI), a first recommendation for the user to achieve the first certification based on the comparison.

2. The computer-implemented method of clause 1, wherein comparing the one or more command usage patterns of the user and the first user group comprises: determining that the user has used a predetermined threshold number of commands in the set of commands a greater amount or equal amount than the first user group; and in response, determining that the first certification is recommended for the user.

3. The computer-implemented method of any of clauses 1-2, wherein comparing the one or more command usage patterns of the user and the first user group comprises: determining a plurality of command categories, wherein each command category includes at least two different commands included in the set of commands; determining that the user has used a predetermined threshold number of command categories a greater amount or equal amount than the first user group; and in response, determining that the first certification is recommended for the user.

4. The computer-implemented method of any of clauses 1-3, wherein the command usage data includes, for each certified user in the first group, usage data for the set of commands up to a date that the certified user achieved the first certification.

5. The computer-implemented method of any of clauses 1-4, further comprising: receiving additional command usage data indicating how much a second user group has used the set of commands of the software application, wherein the user has not achieved a second certification and the second user group comprises a plurality of certified users who have achieved the second certification; comparing one or more command usage patterns of the user and the plurality of certified users of the second user group based on the additional command usage data; and displaying, in the GUI, a second recommendation for the user to not achieve the second certification based on the comparison.

6. The computer-implemented method of any of clauses 1-5, further comprising: determining a numerical quantification of the comparison of the one or more command usage patterns of the user and the second user group; and displaying, in the GUI, the numerical quantification within the second recommendation.

7. The computer-implemented method of any of clauses 1-6, further comprising: determining a first command included in the set of commands that has not been used by the user based on the command usage data; and displaying, within the GUI, a first data point on a circle chart that represents the first command.

8. The computer-implemented method of any of clauses 1-7, further comprising: receiving additional command usage data indicating how much a second user group has used the set of commands of the software application; determining a recommendation value for the first command based on the additional command usage data; and determining a first distance from a center of the circle chart based on the recommendation value for the first command, wherein the first data point is displayed at the first distance within the circle chart to represent the recommendation value for the first command.

9. The computer-implemented method of any of clauses 1-8, wherein the second user group is identified using a collaborative filtering algorithm.

10. The computer-implemented method of any of clauses 1-9, further comprising: receiving, via the command map GUI, a selection of the first data point; and in response, displaying a set of links to a set of items related to the first command, wherein the set of items comprise at least one of an article, a tutorial, a video, a screencast, and a user connection.

11. In some embodiments, one or more non-transitory computer-readable media including instructions that, when executed by one or more processors, cause the one or more processors to perform the steps of: receiving command usage data indicating how much a user and a first user group has used a set of commands of a software application, wherein the user has not achieved a first certification and the first user group comprises a plurality of certified users who have achieved the first certification; comparing one or more command usage patterns of the user and the plurality of certified users of the first user group based on the command usage data; and displaying, within a graphical user interface (GUI), a first recommendation for the user to achieve the first certification based on the comparison.

12. The one or more non-transitory computer-readable media of clause 11, wherein comparing the one or more command usage patterns of the user and the first user group comprises: determining that the user has used a predetermined threshold number of commands in the set of commands a greater amount or equal amount than the first user group; and in response, determining that the first certification is recommended for the user.

13. The one or more non-transitory computer-readable media of any of clauses 11-12, wherein comparing the one or more command usage patterns of the user and the first user group comprises: determining a plurality of command categories, wherein each command category includes at least two different commands included in the set of commands; determining that the user has used a predetermined threshold number of command categories a greater amount or equal amount than the first user group; and in response, determining that the first certification is recommended for the user.

14. The one or more non-transitory computer-readable media of any of clauses 11-13, further comprising: receiving additional command usage data indicating how much a second user group has used the set of commands of the software application, wherein the user has not achieved a second certification and the second user group comprises a plurality of certified users who have achieved the second certification; comparing one or more command usage patterns of the user and the plurality of certified users of the second user group based on the additional command usage data; and displaying, in the GUI, a second recommendation for the user to not achieve the second certification based on the comparison.

15. The one or more non-transitory computer-readable media of any of clauses 11-14, further comprising: determining a numerical quantification of the comparison of the one or more command usage patterns of the user and the second user group; and displaying, in the GUI, the numerical quantification within the second recommendation.

16. The one or more non-transitory computer-readable media of any of clauses 11-15, further comprising: determining a first command included in the set of commands that has not been used by the user based on the command usage data; and displaying, within the GUI, a first data point on a circle chart that represents the first command.

17. The one or more non-transitory computer-readable media of any of clauses 11-16, further comprising: receiving additional command usage data indicating how much a second user group has used the set of commands of the software application; determining a recommendation value for the first command based on the additional command usage data; and determining a first distance from a center of the circle chart based on the recommendation value for the first command, wherein the first data point is displayed at the first distance within the circle chart to represent the recommendation value for the first command.

18. The one or more non-transitory computer-readable media of any of clauses 11-17, wherein the second user group is based on at least one of job title, industry field, department, project, team, company, classroom, and educational background.

19. The one or more non-transitory computer-readable media of any of clauses 11-18, wherein the second user group is identified using a collaborative filtering algorithm.

20. In some embodiments, a computing system comprising: a memory that includes instructions; and a processor that is coupled to the memory and, upon executing the instructions, performs the steps of: receiving command usage data indicating an amount of usage of a set of commands of an application by a user and a first user group, wherein the user has not achieved a first certification and the first user group comprises two or more certified users who have achieved the first certification; comparing command usage patterns of the user and the first user group based on the command usage data; and displaying, within a graphical user interface (GUI), a first recommendation for the user to achieve the first certification based on the comparison.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method, comprising:
generating, at a plurality of client machines associated with a user and a first user group, a first plurality of command events associated with a set of commands of a software application, wherein each command event comprises a command identifier for an executed command of the software application, a user identifier, and a timestamp, wherein the user has not achieved a first certification associated with the software application and the first user group comprises a plurality of certified users who have each achieved the first certification;
transmitting, via a network, the first plurality of command events to a server machine;
receiving, at a first client machine associated with the user, first command usage data from the server machine that generates a first certification table associated with the first certification by determining a second plurality of command events included in the first plurality of command events, wherein each command event included in the second plurality of command events includes the user identifier of a certified user and a timestamp that is before a date that the certified user had achieved the first certification, and by computing command usage patterns of the first user group for the set of commands based on the command identifiers specified in the second plurality of command events, wherein the first command usage data includes the first certification table and command usage patterns of the user for the set of commands that is computed by the server machine based on a third plurality of command events included in the first plurality of command events corresponding to the user;
comparing the command usage patterns of the user and the first user group based on the first command usage data;
displaying, within a graphical user interface (GUI), a first recommendation for the user to achieve the first certification based on the comparison,
determining a first command included in the set of commands that has not been used by the user and a first recommendation value for the first command based on the first command usage data; and
displaying, within the GUI, a first data point on a circle chart that represents the first recommendation value for the first command comprising determining a pixel distance from a center of the circle chart based on the first recommendation value and a predetermined pixel ratio that specifies a number of pixels per each single increment of a recommendation value, wherein the first data point is displayed at the pixel distance from the center of the circle chart.

2. The computer-implemented method of claim 1, wherein comparing the command usage patterns of the user and the first user group comprises:
determining that the user has used a predetermined threshold number of commands in the set of commands a greater amount or equal amount than the first user group; and
in response, determining that the first certification is recommended for the user.

3. The computer-implemented method of claim 1, wherein comparing the command usage patterns of the user and the first user group comprises:
determining a plurality of command categories, wherein each command category includes at least two different commands included in the set of commands;
determining that the user has used a predetermined threshold number of command categories a greater amount or equal amount than the first user group; and
in response, determining that the first certification is recommended for the user.

4. The computer-implemented method of claim 1, further comprising:
receiving additional command usage data indicating how much a second user group has used the set of commands of the software application, wherein the user has not achieved a second certification and the second user group comprises a plurality of certified users who have achieved the second certification;
comparing one or more command usage patterns of the user and the plurality of certified users of the second user group based on the additional command usage data; and
displaying, in the GUI, a second recommendation for the user to not achieve the second certification based on the comparison.

5. The computer-implemented method of claim 4, further comprising:
determining a numerical quantification of the comparison of the one or more command usage patterns of the user and the second user group; and
displaying, in the GUI, the numerical quantification within the second recommendation.

6. The computer-implemented method of claim 1, further comprising:
receiving, via the command map GUI, a selection of the first data point; and
in response, displaying a set of links to a set of items related to the first command, wherein the set of items comprise at least one of an article, a tutorial, a video, a screencast, and a user connection.

7. One or more non-transitory computer-readable media including instructions that, when executed by one or more processors, cause the one or more processors to perform the steps of:
generating, at a plurality of client machines associated with a user and a first user group, a first plurality of command events associated with a set of commands of a software application, wherein each command event comprises a command identifier for an executed command of the software application, a user identifier, and a timestamp, wherein the user has not achieved a first certification associated with the software application and the first user group comprises a plurality of certified users who have each achieved the first certification;
transmitting, via a network, the first plurality of command events to a server machine;
receiving, at a first client machine associated with the user, first command usage data from the server machine that generates a first certification table associated with the first certification by determining a second plurality of command events included in the first plurality of command events, wherein each command event included in the second plurality of command events includes the user identifier of a certified user and a timestamp that is before a date that the certified user had achieved the first certification, and by computing command usage patterns of the first user group for the set of commands based on the command identifiers specified in the second plurality of command events, wherein the first command usage data includes the first certification table and command usage patterns of the user for the set of commands that is computed by the server machine based on a third plurality of command events included in the first plurality of command events corresponding to the user;

comparing the command usage patterns of the user and the first user group based on the first command usage data;

displaying, within a graphical user interface (GUI), a first recommendation for the user to achieve the first certification based on the comparison;

determining a first command included in the set of commands that has not been used by the user and a first recommendation value for the first command based on the first command usage data; and displaying, within the GUI, a first data point on a circle chart that represents the first recommendation value for the first command comprising determining a pixel distance from a center of the circle chart based on the first recommendation value and a predetermined pixel ratio that specifies a number of pixels per each single increment of a recommendation value, wherein the first data point is displayed at the pixel distance from the center of the circle chart.

8. The one or more non-transitory computer-readable media of claim 7, wherein comparing the command usage patterns of the user and the first user group comprises:

determining that the user has used a predetermined threshold number of commands in the set of commands a greater amount or equal amount than the first user group; and in response, determining that the first certification is recommended for the user.

9. The one or more non-transitory computer-readable media of claim 7, wherein comparing the command usage patterns of the user and the first user group comprises:

determining a plurality of command categories, wherein each command category includes at least two different commands included in the set of commands;

determining that the user has used a predetermined threshold number of command categories a greater amount or equal amount than the first user group; and in response, determining that the first certification is recommended for the user.

10. The one or more non-transitory computer-readable media of claim 7, further comprising:

receiving additional command usage data indicating how much a second user group has used the set of commands of the software application, wherein the user has not achieved a second certification and the second user group comprises a plurality of certified users who have achieved the second certification;

comparing one or more command usage patterns of the user and the plurality of certified users of the second user group based on the additional command usage data; and displaying, in the GUI, a second recommendation for the user to not achieve the second certification based on the comparison.

11. The one or more non-transitory computer-readable media of claim 10, further comprising:

determining a numerical quantification of the comparison of the one or more command usage patterns of the user and the second user group; and displaying, in the GUI, the numerical quantification within the second recommendation.

12. The one or more non-transitory computer-readable media of claim 7, wherein the first user group is based on at least one of job title, industry field, department, project, team, company, classroom, and educational background.

13. A computing system comprising:

a memory that includes instructions; and a processor that is coupled to the memory and, upon executing the instructions, performs the steps of:

generating a first plurality of command events associated with a set of commands of a software application that are executed by a user and a first user group, wherein each command event comprises a command identifier for an executed command of the software application, a user identifier, and a timestamp, wherein the user has not achieved a first certification associated with the software application and the first user group comprises a plurality of certified users who have each achieved the first certification;

transmitting, via a network, the first plurality of command events to a server machine;

receiving first command usage data from the server machine that generates a first certification table associated with the first certification by determining a second plurality of command events included in the first plurality of command events, wherein each command event included in the second plurality of command events includes the user identifier of a certified user and a timestamp that is before a date that the certified user had achieved the first certification, and by computing command usage patterns of the first user group for the set of commands based on the command identifiers specified in the second plurality of command events, wherein the first command usage data includes the first certification table and command usage patterns of the user for the set of commands that is computed by the server machine based on a third plurality of command events included in the first plurality of command events corresponding to the user;

comparing the command usage patterns of the user and the first user group based on the first command usage data;

displaying, within a graphical user interface (GUI), a first recommendation for the user to achieve the first certification based on the comparison;

determining a first command included in the set of commands that has not been used by the user and a first recommendation value for the first command based on the first command usage data; and displaying, within the GUI, a first data point on a circle chart that represents the first recommendation value for the first command comprising determining a pixel distance from a center of the circle chart based on the first recommendation value and a predetermined pixel ratio that specifies a number of pixels per each single increment of a recommendation value, wherein the first data point is displayed at the pixel distance from the center of the circle chart.

* * * * *